United States Patent [19]

Okubo

[11] Patent Number: 5,523,818
[45] Date of Patent: Jun. 4, 1996

[54] CAMERA SYSTEM

[75] Inventor: Mitsumasa Okubo, Hachioji, Japan

[73] Assignee: Olympus Optical Co., Ltd., Tokyo, Japan

[21] Appl. No.: 276,990

[22] Filed: Jul. 19, 1994

Related U.S. Application Data

[63] Continuation of Ser. No. 893,940, Jun. 4, 1992, abandoned.

[30] Foreign Application Priority Data

Jun. 5, 1991 [JP] Japan .................................. 3-134431
Oct. 22, 1991 [JP] Japan .................................. 3-274289

[51] Int. Cl.$^6$ .............................. G03B 3/00; G03B 17/00
[52] U.S. Cl. ................................ 354/400; 354/286
[58] Field of Search .................... 354/400, 455, 354/286, 410, 451, 452, 195.12; 310/316

[56] References Cited

U.S. PATENT DOCUMENTS

| | | | |
|---|---|---|---|
| 4,833,358 | 5/1989 | Suzuki et al. | 310/316 |
| 4,952,834 | 8/1990 | Okada | 310/316 |
| 5,013,982 | 5/1991 | Sasaki | 318/114 |
| 5,053,798 | 10/1991 | Ohara et al. | 354/400 |
| 5,093,680 | 3/1992 | Suzuki et al. | 354/400 |
| 5,162,708 | 11/1992 | Naito et al. | 318/116 |
| 5,179,311 | 1/1993 | Suganuma | 310/316 |
| 5,196,879 | 3/1993 | Hata | 354/400 |
| 5,198,732 | 3/1993 | Morimoto | 318/116 |
| 5,255,043 | 10/1993 | Kawasaki | 354/402 |

FOREIGN PATENT DOCUMENTS 61-251490  11/1986  Japan .
62-220937  9/1987  Japan .
63-234881  9/1988  Japan .

*Primary Examiner*—Michael L. Gellner
*Assistant Examiner*—Nicholas J. Tuccillo
*Attorney, Agent, or Firm*—Louis Weinstein

[57] ABSTRACT

The present invention provides, on the camera body side thereof, a pulse signal generator for generating continuous pulse signal trains, the frequency of which is four times the frequency employed for driving a supersonic motor and a pulse width which corresponds to the pulse width of an AC voltage for driving the supersonic motor. Furthermore, a unit detachable from the camera body and including the supersonic motor generates the AC voltage for driving the supersonic motor which corresponds to the pulse signal.

23 Claims, 28 Drawing Sheets

FIG.2
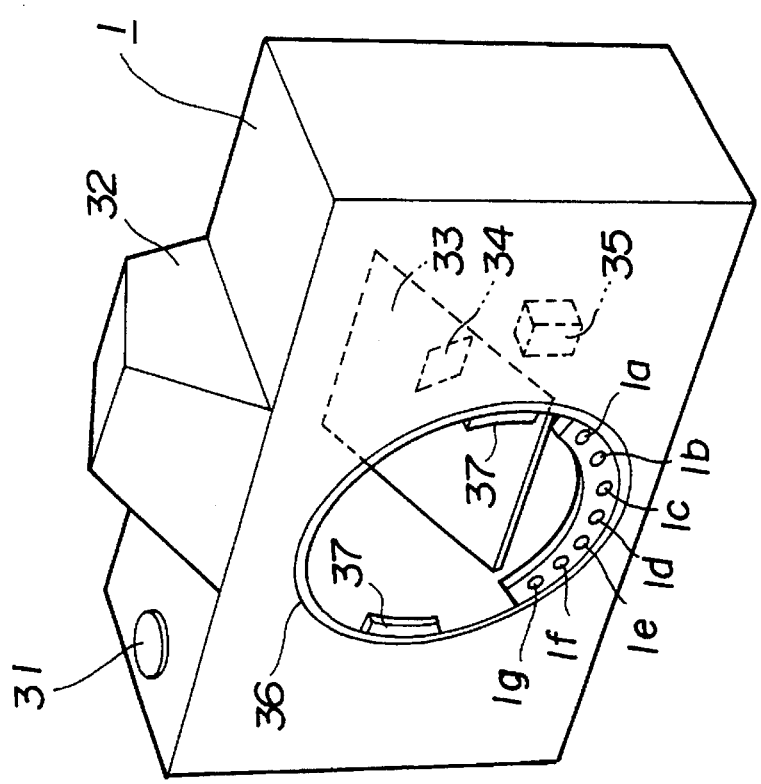
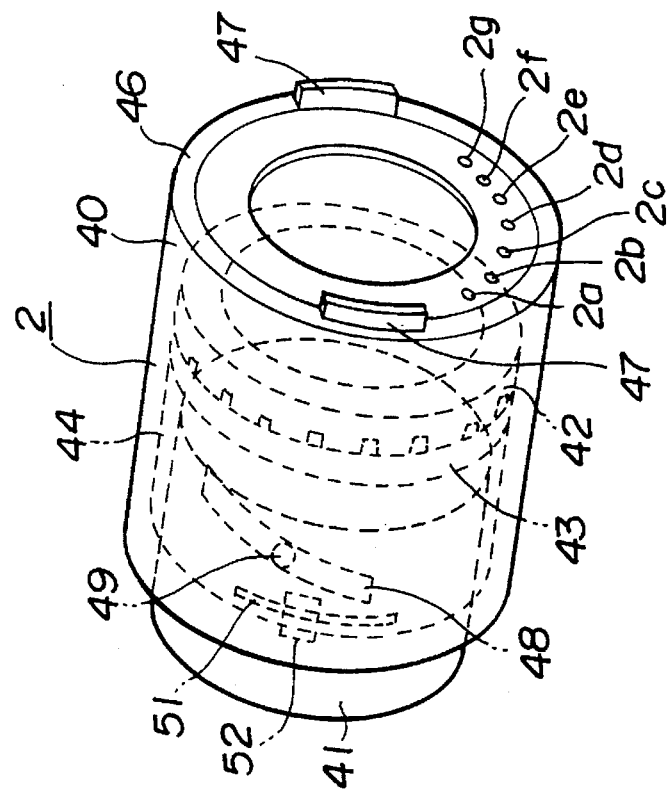

FIG. 25
TRANSMISSION PULSE — RISING PULSE
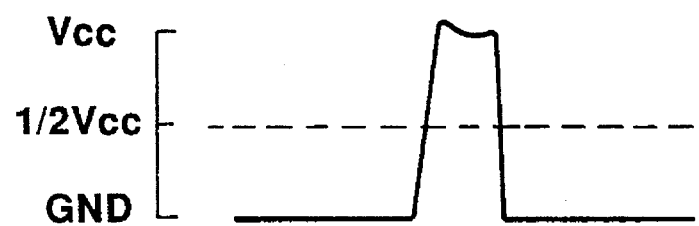
BUFFER TYPE I
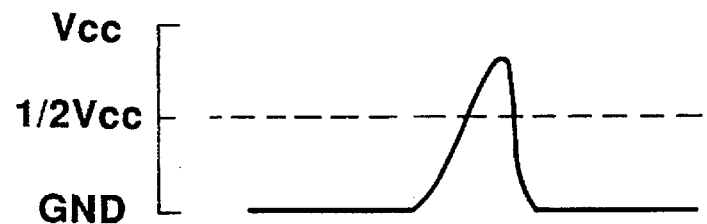
BUFFER TYPE II
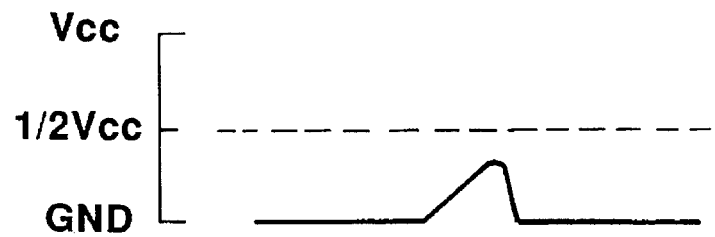
BUFFER TYPE III
PULSE RECEIVED WHEN BUFFER TYPE III IS USED

FIG. 28
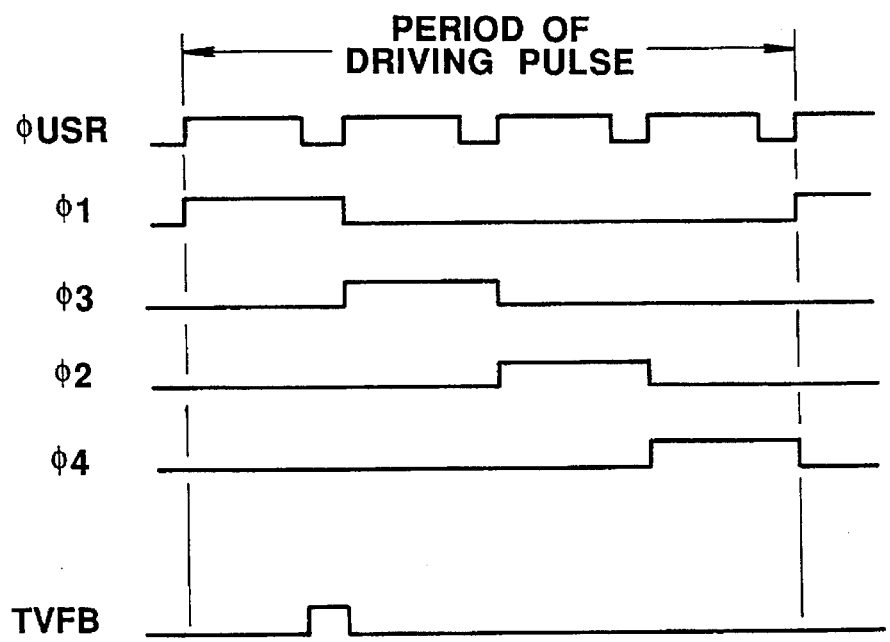

CAMERA SYSTEM

This is a continuation of Application Ser. No. 07/893,940, filed Jun. 4, 1992, now abandoned.

BACKGROUND OF THE INVENTION

1. Field of the Invention

The present invention relates to a camera system, and more particularly, to a camera system in which a camera body and a unit are selectively mounted on the camera body and are driven by a supersonic motor perform operations for a camera in relation to each other by microcomputers or the like.

2. Related Art Statement

Recently, the advancement of the functions of the camera causes the microcomputer used in only the camera body to be provided as well in a unit which is detachable from the camera body. The microcomputer included by the unit and the microcomputer located in the camera body are arranged to be operated in synchronization with each other so theft the desired function of the camera system is accomplished. In order to efficiently control the unit in a structure of the above-mentioned type, a technological means for mutually communicating information between the two microcomputers by means of a serial communication has been disclosed in, for example, Japanese Patent Laid-Open No. (62-220937. Since the aforesaid technology must be established when the functions of a camera are performed while communicating a large quantity of information between the camera body and the unit, it has been widely used.

As the source for operating a driving mechanism included by the unit, a supersonic motor has been widely used recently. In this case, the driving frequency of the supersonic motor must be set to a range adjacent to the resonant frequency of the supersonic motor. However, each of the supersonic motors has a specific resonant frequency and therefore the driving frequency must be precisely adjusted in order to cause the motor to be satisfactorily rotated at a high efficiency.

For example, a technology for finely adjusting the oscillation frequency has been disclosed in Japanese Patent Laid-Open No. 62-234881 in which an analog type voltage controlling oscillation circuit having resistors and capacitors is used, feed-back voltage obtained by phase-detecting a feedback signal obtained from the feedback electrode of the supersonic motor and by smoothing it by a low-pass filter is applied to a control terminal of the voltage controlling oscillator so as to form a feedback loop.

The analog type oscillating circuit of the above-mentioned type has a problem in that the stability of the oscillation frequency deteriorates due to a factor such as the temperature. Furthermore, some means for changing the resistance value must be provided for the purpose of adjusting the circuit. Therefore, time and cost become too large as compared with a method in which the circuit is adjusted by a digital means using a memory or a microcomputer.

Accordingly, the applicant of the present invention has suggested a circuit for driving a supersonic motor in U.S. Pat. No. 5,013,982 which used an oscillating circuit for dividing the RF signal by a counter or the like in a digital manner, which reveals satisfactory controllability, which can be adjusted easily and from which a stable oscillation frequency can be obtained.

However, according to the disclosure made in U.S. Pat. No. 5,013,982 in which the frequency of the driving signal for driving the supersonic motor is obtained by dividing the RF signal by a counter or the like in a digital manner, the original oscillation frequency of the RF signal undesirably becomes $$50 \text{ kHz} \times (50 \text{ kHz}/0.2 \text{ kHz}) = 12.5 \text{ MHz}$$

in a case where the frequency is varied in units of, for example, 0.2 kHz, which is required to perform smooth control, assuming that the frequency for driving the motor is 50 kHz. What is worse, since a duty ratio of 50% cannot be realized in the above-described state in which the signal having the aforesaid original oscillation frequency is used, it is halved for securing safety. However, in this case, an original oscillation frequency of 25 MHz must be used. An oscillator adapted to the aforesaid high frequency and a digital circuit which is operated at the high frequency must be supplied with a large electric current of a value larger than 10 mA and as well as smaller than several tens of mA.

On the other hand, in order to establish automatic focusing and/or in order to raise the efficiency of the employed elements, a super-microcomputer capable of performing high speed calculation has been used in the camera body. For example, in a case where an oscillator adapted to 20 to 25 MHz and a microcomputer adapted to the aforesaid frequency are loaded on the camera body, a capacity (for example, 40 mA of the overall capacity 50 mA) larger than the half of that of the DC/DC converter which constitutes the IC-type power supply is undesirably consumed in the camera body. Therefore, a limit is present when the IC type power is supplied from the camera body to the unit. To the contrary, if the capacity of the DC/DC converter is enlarged to cope with the above-mentioned problem, the size of the camera becomes too large.

As a result, if the RF oscillator and the high frequency operation portion are individually provided in a unit in a case where the supersonic motor in the unit is driven by a driving circuit of a digital type, the power supply in the camera body must bear an excessively large load.

According to the method disclosed in U.S. Pat. No. 5,013,982, four types of digital signal must be used because its basic structure is adapted to the push-pull circuit. Furthermore, feedback signals are required to detect the phase of the signal for the monitor electrode of the supersonic motor and the velocity of the supersonic motor so as to feed back the frequency and the pulse width. If the above-described signals are transmitted/received between the unit and the camera body through an exclusive line, the number of signal pins increases excessively, causing limits to present in the location and the size of the contacts. As a result, the cost cannot be reduced and the signal transmission reliability at the contacts will deteriorate.

In Japanese Patent Laid-Open No. 61-251490 and U.S. Pat. No. 4,833,358, methods have been disclosed in which a feedback system for maintaining the phase constant for the purpose of stably driving the supersonic motor is provided, the method being arranged in such a manner that a monitor electrode is provided on the supersonic motor, the phase of the output signal from the monitor electrode with respect to the driving pulse is detected and the driving frequency is changed.

However, similar to U.S. Pat. No. 5,013,982, the aforesaid disclosures have not suggested a preferable method of separating the camera body and the unit from each other.

The applicant of the present invention has disclosed a means for driving the supersonic motor by employing a frequency oscillation of 4 n times. However, a plurality of signal transmission lines are formed from the camera body to the unit. Therefore, the number of signal pins increases excessively, causing limits to present in the location and the size of the contacts. As a result, the cost cannot be reduced and the signal transmission reliability at the contacts will deteriorate. Also the aforesaid disclosures have not suggested a preferable method of separating the camera body and the unit from each other.

OBJECTS AND SUMMARY OF THE INVENTION

A first object of the present invention is to provide a camera system in which the electric current consumption in the RF generating and operating portions is not increased even if a lens unit is installed and therefore the electric current consumption in the IC system can be significantly reduced.

A second object of the present invention is to provide a camera system with which the number of electric contacts can be decreased and which is able to reduce cost and prevent deterioration in system reliability.

A third object of the present invention is to provide a camera system which generates as AC voltage having reduced distortion and which therefore reveals satisfactory driving characteristics.

A fourth object of the present invention is to provide a camera system in which a stable frequency can be obtained regardless of the temperature and in which frequency can be adjusted easily.

A fifth object of the present invention is to provide a camera system in which the driving parameter changing information is transmitted to the camera body by an original information transmitting means and therefore the necessity of increasing electric contacts can be eliminated and the quantity of information to be transmitted can be minimized.

A sixth object of the present invention is to provide a camera system adaptable to a high speed operation in which the intervals of generation of the encoder pulses are short.

A seventh object of the present invention is to provide a camera system in which the phase comparison timing can be arbitrarily set to a phase in 360° while establishing high resolution and eliminating a necessity of using exclusive hardware.

An eighth object of the present invention is to provide a camera system capable of enabling the unit to be safely and reliably operated even if a buffer of low output performance and a pulse signal passage having a large capacity are used.

Briefly, the present invention comprises a pulse signal generating means for generating continuous pulse signal trains having a predetermined pulse width and frequency and means for generating an AC voltage for driving the supersonic motor in accordance with the pulse signal trains.

The above and advantages of the present invention will become further apparent from the following detailed explanation.

BRIEF DESCRIPTION OF THE DRAWINGS

FIG. 2 is a schematic and exploded perspective view which illustrates a camera body and a lens unit of a second and a third embodiments of the camera system according to the present invention;

FIG. 25 is a graph which illustrate the pulse waveforms in a case where the basic pulse signal is selected with the first transition pulse according to the sixth embodiment;

FIG. 28 is a timing chart which illustrates the state of the 4-phase pulse signal of the basic pulse signal in a case where the basic pulse signal is selected with the first transition pulse according to the sixth embodiment,

DETAILED DESCRIPTION OF THE PREFERRED EMBODIMENTS

Preferred embodiments of the present invention will now be described with reference to the drawings.

Figure 1:
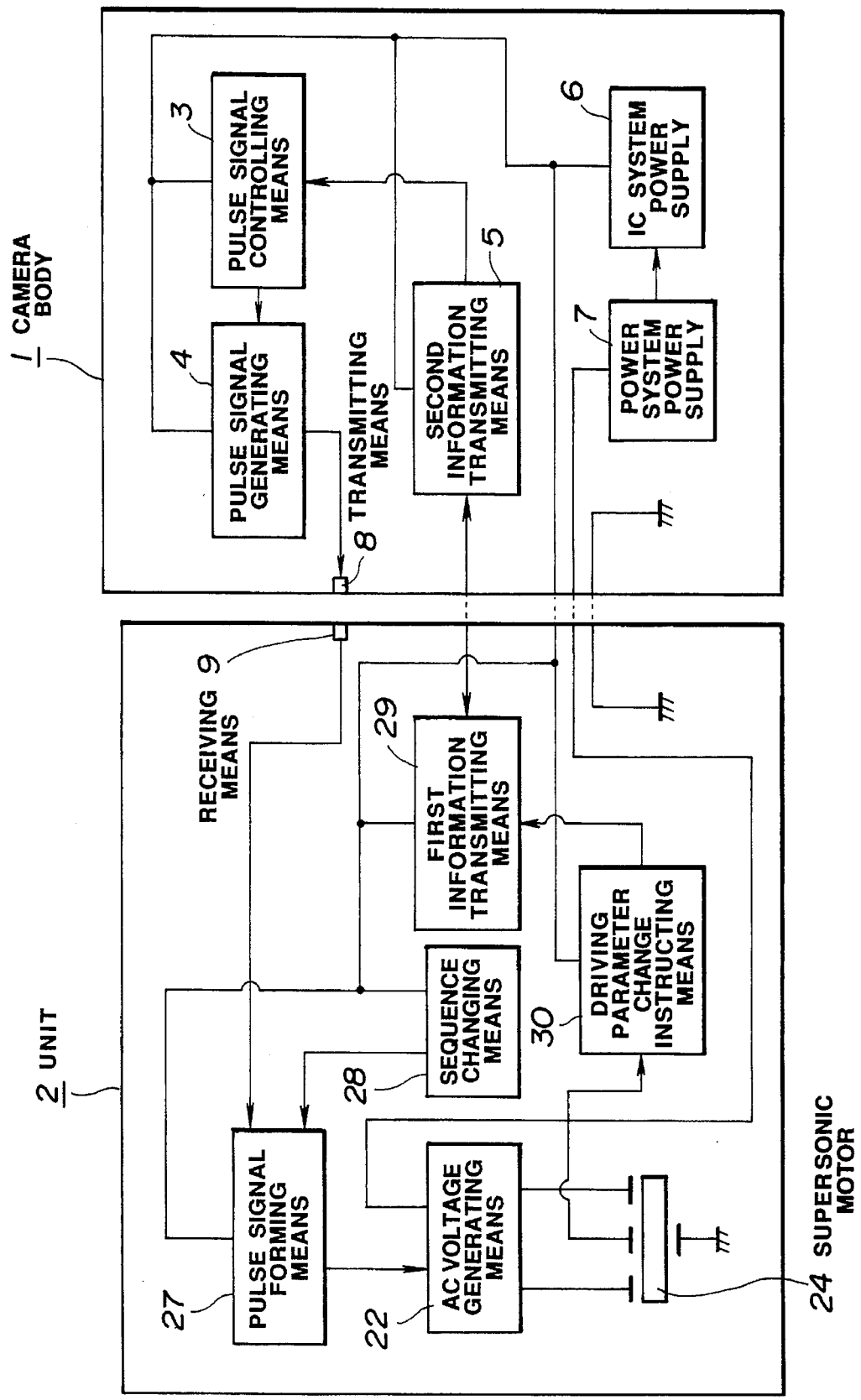
FIG. 1 is a block diagram which illustrates the main structure of an electric circuit of a first embodiment of a camera system according to the present invention.

FIG. 1 is a block diagram which illustrates a first embodiment of a camera system according to the present invention. As shown in FIG. 1, the camera system according to the first embodiment comprises a camera body 1, a unit 2 which is detachable with respect to the camera body 1, a supersonic motor 24 provided for the unit 2 and rotated by AC voltage applied thereto, an AC voltage generating means 22 provided for the unit 2 to generate the AC voltage to be applied to the supersonic motor 24, a first information transmitting means 29 provided for the unit 2 to perform information communication to and from the camera body 1, a driving parameter change instructing means 30 provided for the unit 2 to detect the rotational state of the supersonic motor 24 so as to determine information for changing at least one of the driving parameters, that is, the frequency or the pulse width of the AC voltage, a pulse signal generating means 4 provided for the camera body 1 to generate a pulse signal having a frequency which is four times that of the AC voltage and a pulse width which corresponds to that of the AC voltage, a second information transmitting means 5 provided for the camera body 1 to transmit information to and receive information from the unit 2, a pulse signal controlling means 3 provided for the camera body 1 to control at least one of the frequency or the pulse width of the pulse signal in accordance with information for changing the driving parameter determined by the driving parameter change instructing means 30 and a transmitting means 8 provided for the camera body 1 to transmit the pulse signal to the unit 2. Receiving means 9 is provided for the unit 2 to receive the pulse signal, a pulse forming means 27 is provided for the unit 2 to form four pulses as the second to the fourth pulse signals from the pulse signal, a sequence changing means 28 is provided for the unit 2 to change the sequence of the second to the fourth pulse signals in accordance with a fact that the supersonic motor 24 is rotated forwards or backwards, an AC voltage generating means 22 is provided for the unit 2 to generate the AC voltage to be applied to the supersonic motor 24 from the first to the fourth pulse signals, the driving parameter change instructing means 30 is provided for the unit 2 to detect the rotational state of the supersonic motor 24 so as to determine information for changing at least one of the driving parameters, that is, the frequency or the pulse width of the AC voltage, and a first information transmitting means 29 is provided for the unit 2 to transmit information to the camera body 1.

The characteristics of the camera system according to the first embodiment will now be described.

(1) A method is employed in which an oscillated high frequency pulse is divided by the counter so as to form the pulse for driving the supersonic motor 24.

(2) In this case, the pulse signal generating means, which requires a large quantity of electric currents because it oscillates the high frequency pulses and it is operated at the high frequency, is provided in the camera body 1 which must oscillate high frequency pulses and which must be operated at the high frequency.

(3) The pulse signals, which are the basis for generating the AC voltage for driving the supersonic motor, are aggregated as the first digital pulse which is transmitted to the unit 2 via a pair of connections composed of the transmitting means 8 and the receiving means 9.

(4) The first digital pulse is selected in the unit 2 to provide the four types of digital pulses required to generate the AC voltage.

(5) The information for changing the driving parameter is determined in the unit 2 and is transmitted to the pulse signal control means 3 located in the camera body 1 via the first information transmitting means 29 and the second information transmitting means 5 which are required to perform communication between the unit 2 and the camera body 1.

In other words, in contrast with a structure in which high frequency oscillation takes place in the unit to generate the voltage for driving the supersonic motor 24, the change of the signal transmission system is minimized in such a manner that only one contact pair composed of the signal transmitting means 8 and the receiving means 9 is additionally provided. Therefore, the load of the IC power supply in the camera body 1 can be significantly reduced and the AC voltage can be stably generated while exhibiting good controllability.

The characteristics of the first embodiment of the present invention lies as described above.

Then, two detailed embodiments of the first embodiment, that is, a second and a third embodiments of the present invention will now be described.

The camera systems according to the second and the third embodiments have the same hardware structure but are arranged to act in different ways. That is, the camera system according to the second embodiment is operated in accordance with flow charts shown in FIGS. 11 and 12, while that according to the third embodiment is operated in accordance with flow charts shown in FIGS. 13 and 14.

First, the structure of each of the second and the third embodiments will now be described with reference to FIGS. 2 to 10. As the unit 2, a lens 2 is applied for making the description.

FIG. 2 shows an exploded perspective view of a camera body and a lens unit of the camera systems according to the second and the third embodiments. Reference numeral 1 represents a camera body, 31 represents a release button, 32 represents a finder having a penta-prism and 33 represents a main mirror for transmitting light beams, which have passed through the lens, to the finder 32, the main mirror 33 having a half mirror formed in the central portion thereof. Reference numeral 34 represents a sub-mirror for reflecting the light beams which have passed through the half mirror portion, 35 represents an AF module for finding the range by a known phase difference detection method in accordance with light reflected by the sub-mirror 34, 36 represents a camera mount on the camera body side, 37 represents bayonet claws and 1a to 1g represent electric contacts. Reference numeral 2 represents a lens unit, 40 represents a fixing frame, 41 represents a lens frame and 44 represents a focusing frame. The focusing frame 44 has, on the inner surface thereof, an inner cam groove 48 for spirally guiding a driving pin 49 projecting over the outer surface of the lens frame 41. Thus, when the focusing frame 44 is rotated, the lens frame 41 is guided by the inner cam groove 48 formed in the focusing frame 44 so that it is moved in the direction of the optical axis.

Reference numeral 42 represents a stator of the supersonic motor and 43 represents a rotor of the supersonic motor. Thus, an annular type supersonic motor of a so-called travelling-wave type is formed in which the rotor is rotated when the electrodes of the stator 42 are applied with the AC voltage of a phase A and a phase B. Since the rotor 43 is formed integrally with the focusing frame 44, the focusing frame 44 is integrally rotated when the rotor 43 is rotated. Reference numeral 46 represents a lens side mount, 47 represents a bayonet claw and 2a to 2g represent electric contacts.

The lens unit 2 is detachably fastened to the camera body 1 by the bayonet claws 37 and 47, causing the electric contacts 1a and 1b, 1b and 2b, . . . , 1g and 2g to be respectively brought into contact with each other. As a result, the aforesaid electric contact pairs are respectively electrically connected to each other.

Reference numeral 51 represents a magnetic scale formed on the focusing frame 44 to run in the circumferential direction of the focusing frame 44. Reference numeral 52 represents an MR sensor fixed to the inner surface of the fixed frame 40, the MR sensor being composed of a magnetism-electricity conversion device for detecting change in the magnetism of the magnetic scale and transmitting an electric signal denoting this change. Incidentally, although various electric elements are disposed in the camera body 1 and the lens unit 2, they will be described later.

Figure 3:
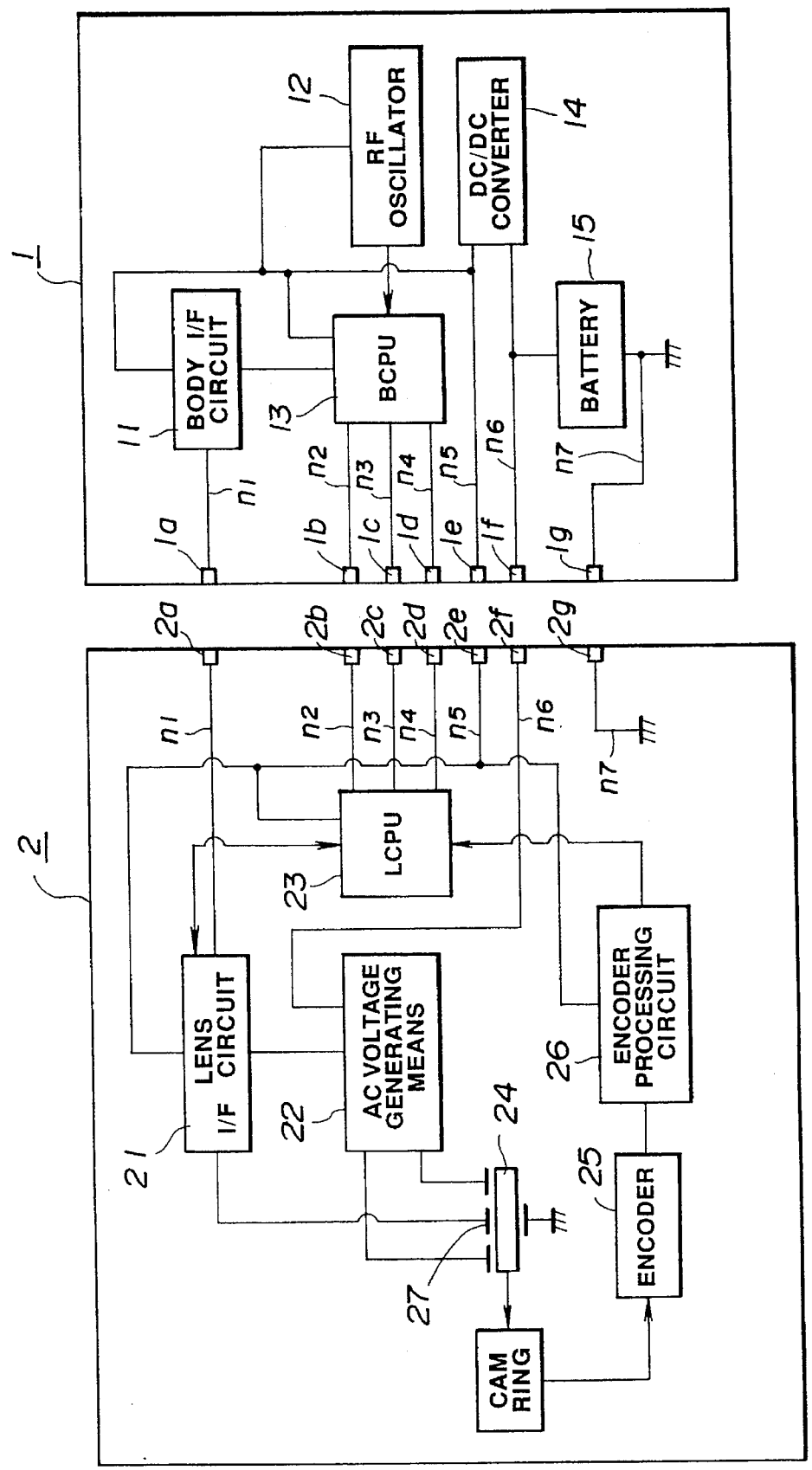
FIG. 3 is a block diagram which illustrates the main structure of an electric circuit of the second and the third embodiments of the camera system according to the present invention.

FIG. 3 is a block diagram which mainly illustrates the essential structure of the electric elements shown in FIG. 2. The camera body 1 has the following elements as well as the aforesaid electric contacts 1a to 1g: a camera body microcomputer (hereinafter abbreviated to a "BCPU") 13 having a communication function, a counter function and a calculation control function, an RF oscillator 12 for supplying operation clocks for the BCPU 13, a body I/F circuit 11 which deforms the pulse supplied from the BCPU 13 so as to generate pulse signal φ USR having a frequency which is four times that of the AC voltage to be applied to the supersonic motor 24 and a pulse width which corresponds to the pulse width of the AC voltage, a battery 15 for supplying electric power to the aforesaid elements and a DC/DC converter 14 for generating stable voltage required to drive the IC system from the electricity supplied from the battery 15.

On the other hand, the lens unit 2 has the following elements as well as the electric contacts 2a to 2g: a lens microcomputer (hereinafter called an "LCPU") 23 for the lens unit 2 and having a communication function and a calculation control function each of which can be effected with a relatively low frequency and a lens I/F circuit 21 which receives the φ USR pulse supplied through the body I/F circuit 11 via the electric contacts 1a and 2a and which is controlled by the LCPU 23 so as to generate four digital pulses φ1 to φ4, the lens I/F circuit 21 being further arranged to process an output from a monitor electrode 27 of the supersonic motor 24 so as to transmit the result of the aforesaid process to the LCPU 23. The lens unit 2 further includes the AC voltage generating means 22 for generating two-phase AC voltage in accordance with the four digital pulses f1 to f4 transmitted from the lens I/F circuit 21, the supersonic motor 24 which is rotated by the two-phase AC voltage, an encoder 25 composed of the magnetic scale 51 and the MR sensor 52 shown in FIG. 2 and an encoder processing circuit 26 for processing an output from the encoder 25 so as to transmit the processed output to the LCPU 13.

The encoder 25 is provided for a cam ring which is operated by the supersonic motor 24 so as to move the lens in such a manner that two sets of the encoders 25 are arranged while shifting their phases. The encoder processing circuit 26 forms a two-phase digital pulse by amplifying and shaping the waveform of the output from the encoder 25, and sequentially magnified by four by a known method, the encoder processing circuit 26 further forming a directional signal which is supplied to the LCPU 23. The LCPU 23 increases/decreases the count of the aforesaid pulse in accordance with the direction signal so as to detect the position. Furthermore, the LCPU 23 measures the interval of the pulses so as to detect the velocity.

The BCPU 13 in the camera body 1 and the LCPU 23 in the lens unit 2 are structured to perform a known clock synchronization serial communication while using signal lines n2, n3 and n4 as a bi-directional data line, a clock line and input/output directional line, respectively. The signal line n1 is provided for the purpose of transmitting the f USR pulse, the signal lines n5 and n6 are provided for the purpose of supplying constant voltage for driving the IC's in unit 2 and the voltage of the battery and the signal line n7 is a ground line.

Figure 4:
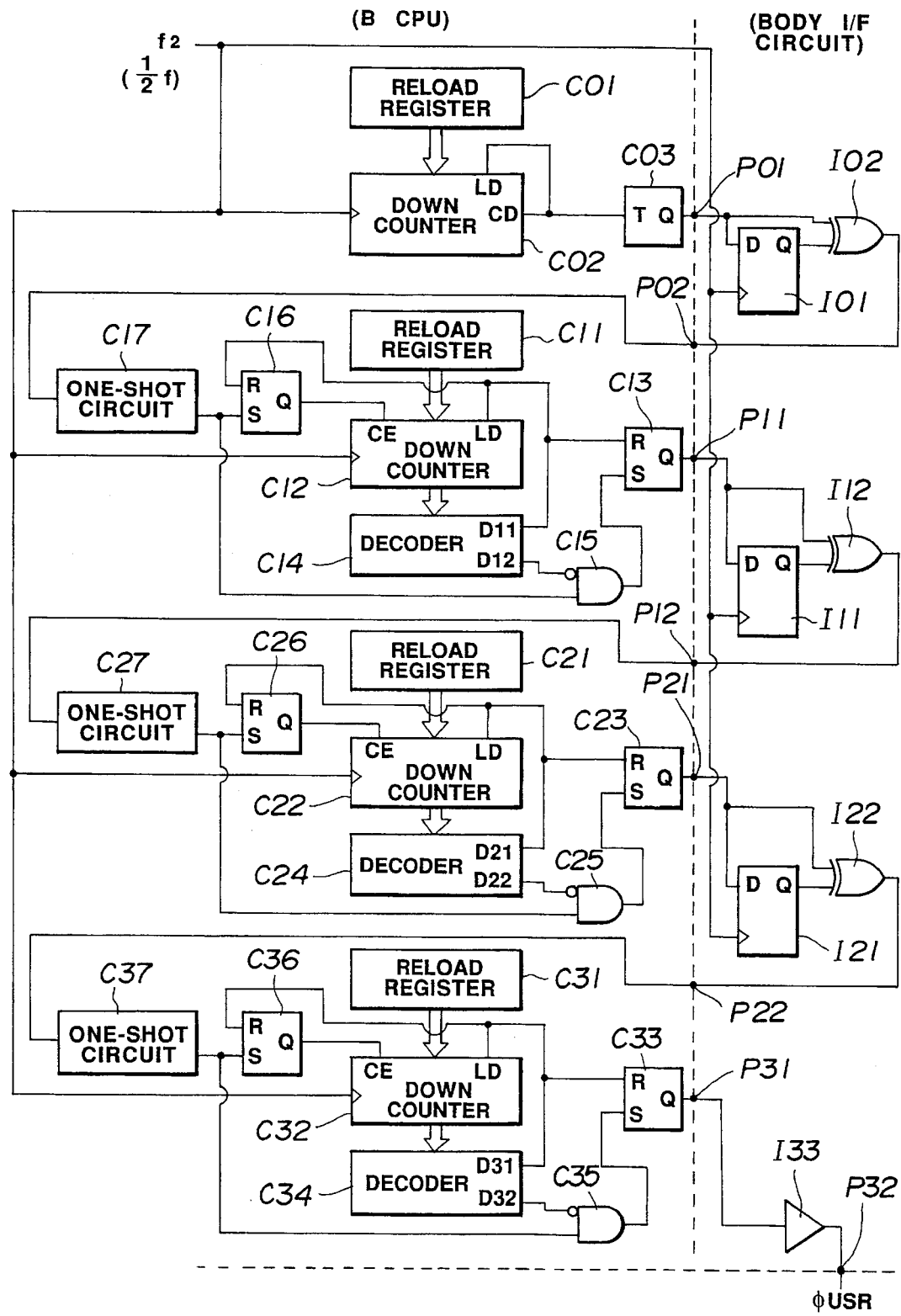
FIG. 4 illustrates a logical circuit for describing the detailed structure of the pulse signal generating means shown in FIG. 1.
Figure 5:
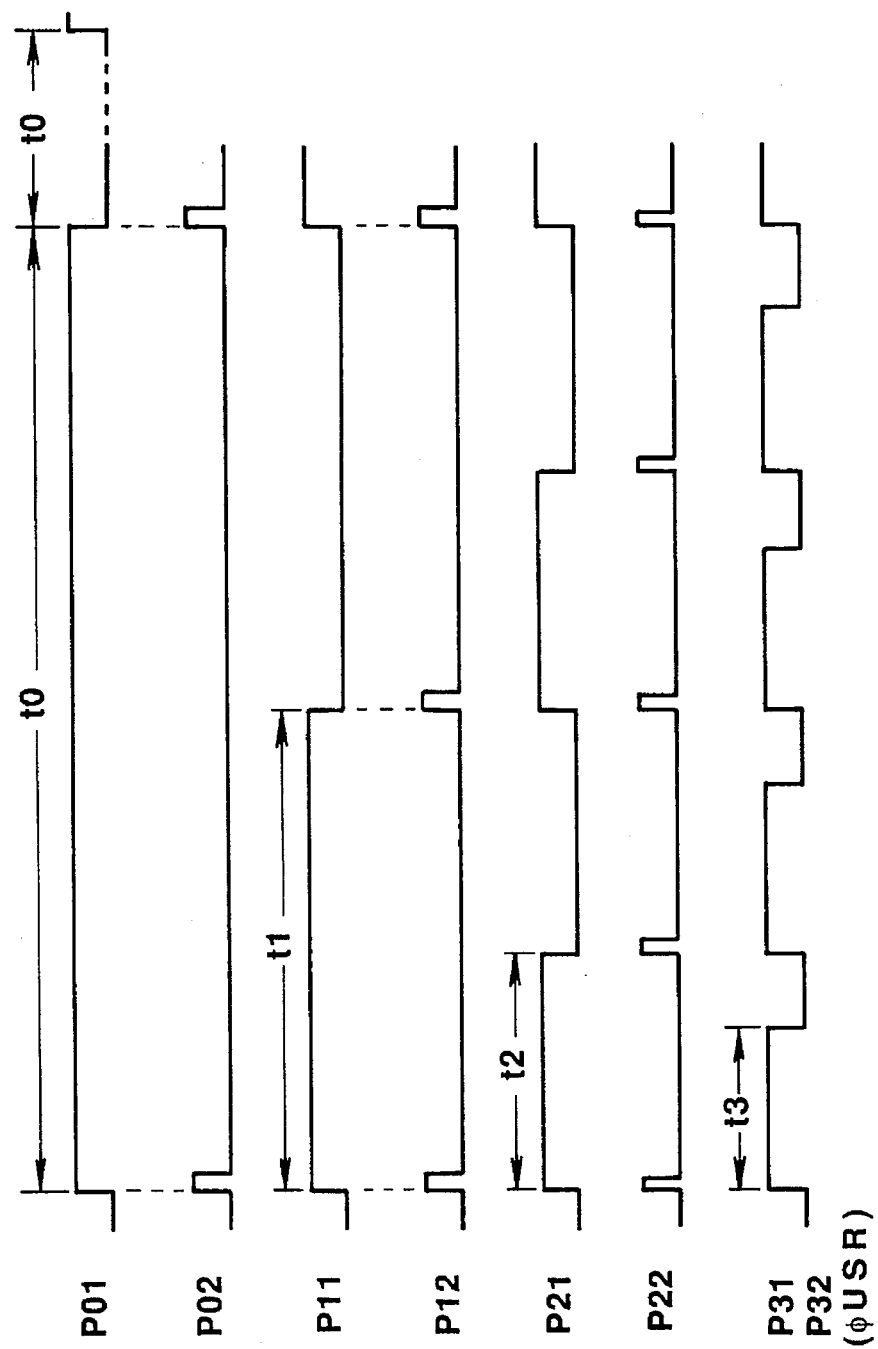
FIG. 5 is a timing chart which illustrates the waveforms for each of the elements shown in FIG. 4.

Then, the internal structure of the camera body 1 will now be described. FIGS. 4 and 5 respectively are a logical circuit diagram which illustrates the detailed structure of the pulse signal generating means 4 and a timing chart of the waveforms of operation signals for each of the elements, in which symbols represent both the measuring point and the name of a signal at the measuring point in such a manner that, for example, P01 represents signal P01 at point P01.

Referring to FIG. 4, C01 represents a reload register to which a value supplied from the calculation control portion of a BCPU 13 (omitted from illustration for brevity) can be written, C02 represents a downcounter and C03 represents a toggle flip-flop. A block composed of the aforesaid elements C01, C02 and C03 is called an 0-th counter block.

C11 represents a reload register, C12 represents a downcounter, C13 and C16 represent RS latches, C14 represents a decoder, C15 represents an AND gate and C17 represents a one-shot circuit for detecting a first transition and generating a pulse denoting the first transition. A block composed of the aforesaid elements C11 to C17 is called a first counter block.

Similarly, elements C21 to C27 and C31 to C37 respectively form a second counter block and a third counter block. The aforesaid blocks are included in the BCPU 13 and arranged in such a manner that writing and reading of values and its control are performed by software.

I01, I11 and I21 represent D flip-flops, I02, I12 and I22 represent EXCLUSIVE-OR gates and I33 represents a buffer, each of which is included in the body I/F circuit 11 (FIG. 3).

In the 0-th counter block, the count of the downcounter C02 is decreased by a degree corresponding to a value of clock pulse φ2 written to the reload register C01, the pulse f2 having been obtained by halving pulse f transmitted from the RF oscillator 12. If the value becomes 0, the output from the toggle flip-flop C03 is inverted and a value of the reload register C01 is again loaded into the downcounter C02. That is, assuming that the number of the reload registers is L0, pulse P01, the frequency of which is f/2×L0 (where f is the oscillation frequency of the RF oscillator 12) and the duty ratio of which is 50% is transmitted as shown in P01 of FIG. 5 The D flip-flop 101 and the EXCLUSIVE-OR gate 102 form pulse P02 in accordance with the waveform of the transmitted pulse as designated by P02 of FIG. 5.

Then, in the first counter block, decrease of the value loaded from the reload register C11 in response to the first transition of the pulse transmitted to the point P02 is commenced in the downcounter C12 while using f2 as the clock. Simultaneously, the RS flip-flop C13 is set so as to transmit "H" to point P11. Since "H" is transmitted to an output terminal D11 of the decoder C14 when the counter value becomes 1 and "H" is transmitted to an output terminal D12 when the counter value becomes 0, the RS flip-flop C13 is reset when the counter value becomes 1 and "L" is transmitted to P11. Furthermore, a value is again loaded into the downcounter C12 from the reload register C11 and counting is inhibited. That is, the first counter block counts f2 by a degree corresponding to the value written to the reload counter in synchronization with the first transition of the supplied pulse and transmits a one-shot pulse corresponding to the length (designated by P11 shown in FIG. 5). On other other hand, the D flip-flop I11 and the EXCLUSIVE OR gate I12 transmit a pulse corresponding to the edge of P11 (designated by P12 shown in FIG. 5). Similarly, the ensuing second and the third counter blocks respectively transmit the one-shot pulse, so that waveforms P21 and P31 (P32) (see FIG. 5) are obtained. That is, the values written to the reload registers C01, C11, C21 and C31 respectively determine pulse widths t0, t1, t2 and t3 shown in FIG. 5. The pulse P31 is transmitted to P32 via the buffer I33 so as to become φ USR, the frequency of φ USR is determined by the combination of t0, t1 and t2 and the pulse width is determined by t3.

Then, the way of changing the frequency of the pulse signal φ USR generated by the pulse signal generating means 4 will now be described with reference to FIG. 6. The continuous four pulses of φ USR become pulses φ1 to φ4 shown in FIGS. 9 and 10 to be described later so as to form A-phase and B-phase AC voltage for driving the supersonic motor via a push-pull circuit shown in FIG. 8 to be described later. Although the frequency of the AC voltage is determined by t0, the waveform of the A-phase and B-phase AC voltage is deformed if the period of the pulses of φ USR are different from each other. As a result, the driving operation is affected adversely. Therefore, it is preferable that the dispersion be minimized. Because of the above-mentioned reasons, the frequency is changed in accordance with the sequence shown in FIG. 6.

Figure 6:
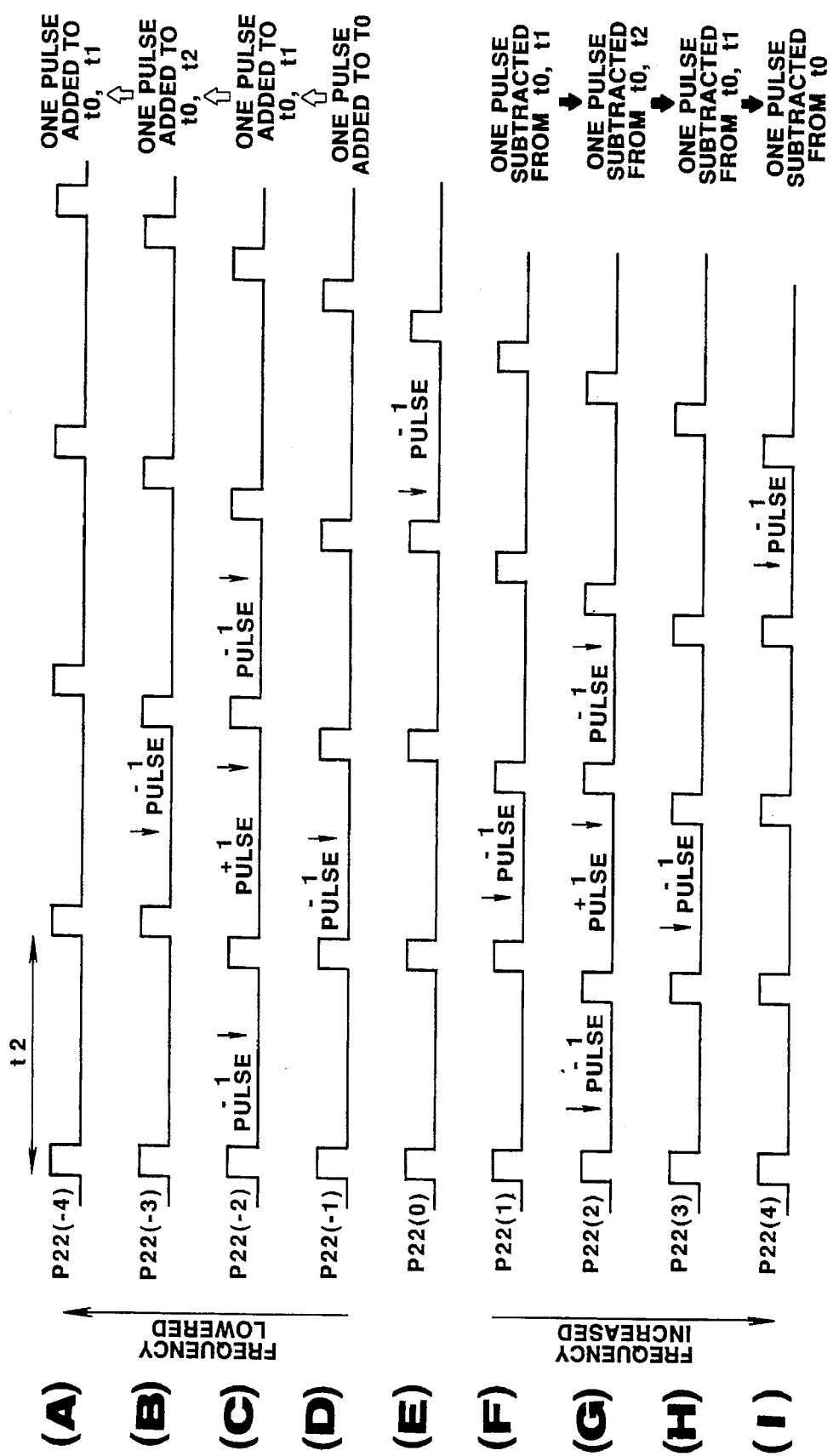
FIG. 6 is a timing chart which illustrates the method of changing the frequency of the pulse signal shown in FIG. 4.

In a case where the output from the EXCLUSIVE-OR gate I22 shown in FIG. 4, that is, input signal P22 supplied to the counter block is as shown in FIG. 6 (E), the frequency is lowered by, first, making the value supplied from the calculation control portion of the BCPU 13 and to be written to the reload register C01 to be increased by one. That is to say, since t0 shown in FIG. 5 is increased by 1 pulse, pulse 53 becomes pulse 54 because it is shifted to the right by one pulse as shown in FIG. 6 (D). Similarly, t0 and t1 respectively are increased by one pulse as shown in FIG. 6 (C). Furthermore, t0 and t2 respectively are increased by one pulse as shown in FIG. 6 (B). Finally, t0 and t1 respectively are increased by one pulse as shown in FIG. 6 (A). As a result, the frequency f can be lowered while satisfactorily preventing the deformation of the waveform of the AC voltage.

In a case where the frequency f is raised, t0 and t1 are decreased by one pulse as shown in FIG. 6 (F), then t0 and t2 respectively are decreased by one pulse as shown in FIG. 6 (G), t0 and t1 respectively are decreased by one pulse as shown in FIG. 6 (H), and finally t0 is decreased by one pulse as shown in FIG. 6 (I). In accordance with the aforesaid sequence of change, the difference in t2 can be made smaller than the period of f2 and therefore driving can be performed stably.

Figure 7:
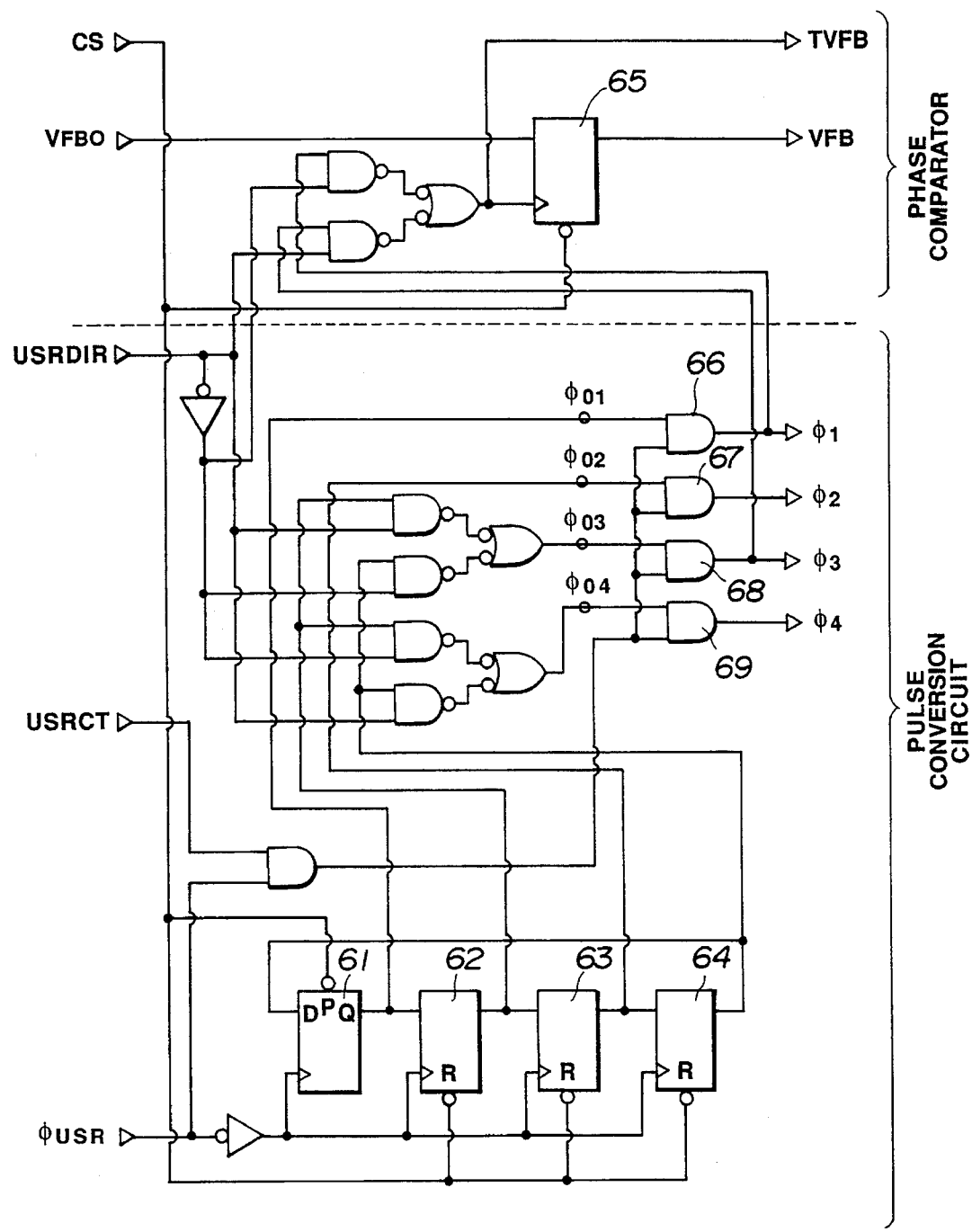
FIG. 7 illustrates a logical circuit for forming four types of digital pulses required to drive the motor from the pulse signal according to the second and the third embodiments.

Then, the interval structure of the lens unit 2 will now be described. FIG. 7 illustrates a portion of the lens I/F circuit 21. In this block, four digital pulses φ1 to φ4 are formed from the first digital pulse φ USR. The φ USR is used to generate pulse selection signals φ01 to φ04 (see FIGS. 9 and 10) by a shift register or the like composed of four D flip-flops 61 to 64.

Figure 9:
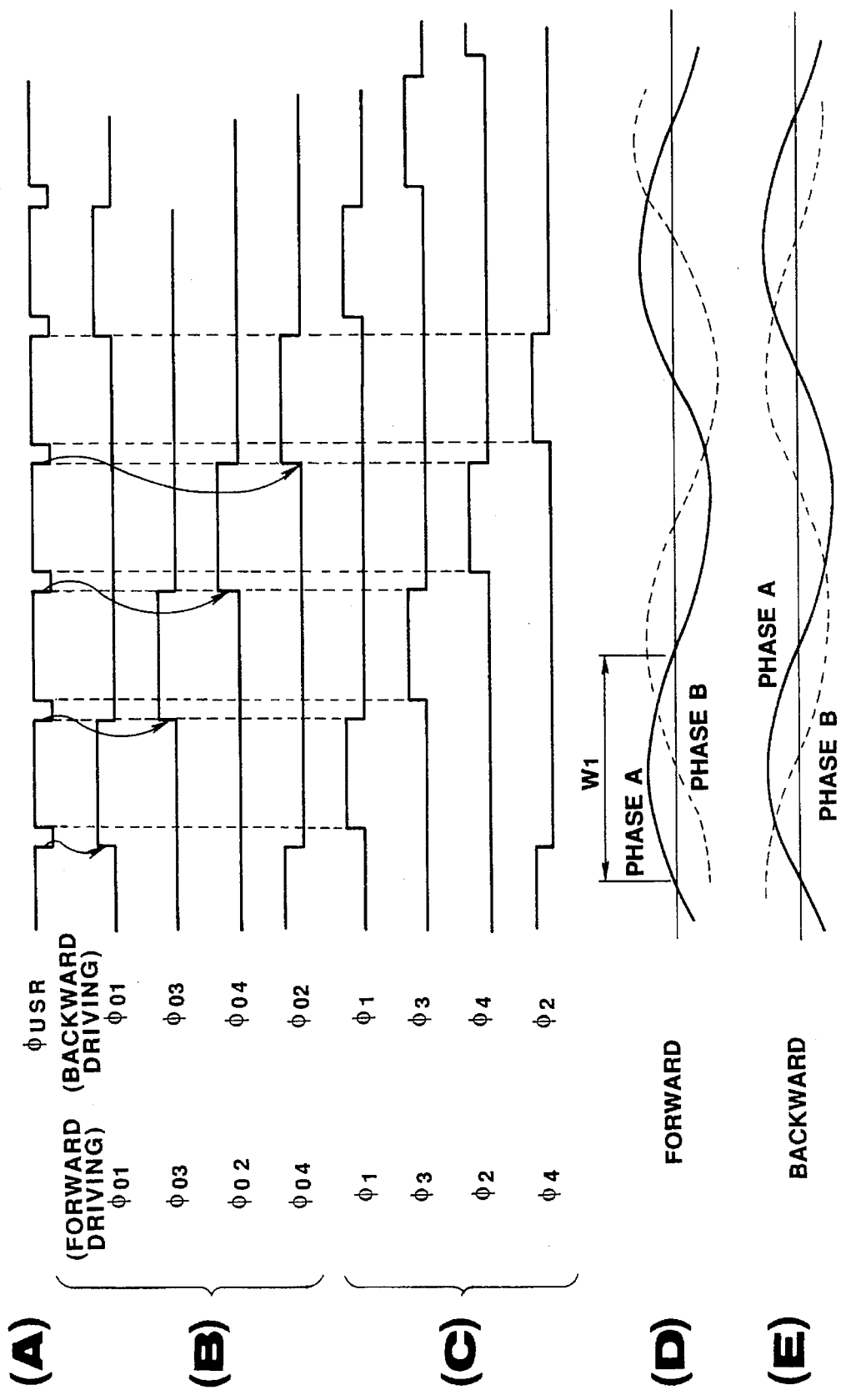
FIG. 9 is a timing chart which illustrates the operation to be performed in the structures shown in FIGS. 7 and 8.
Figure 10:
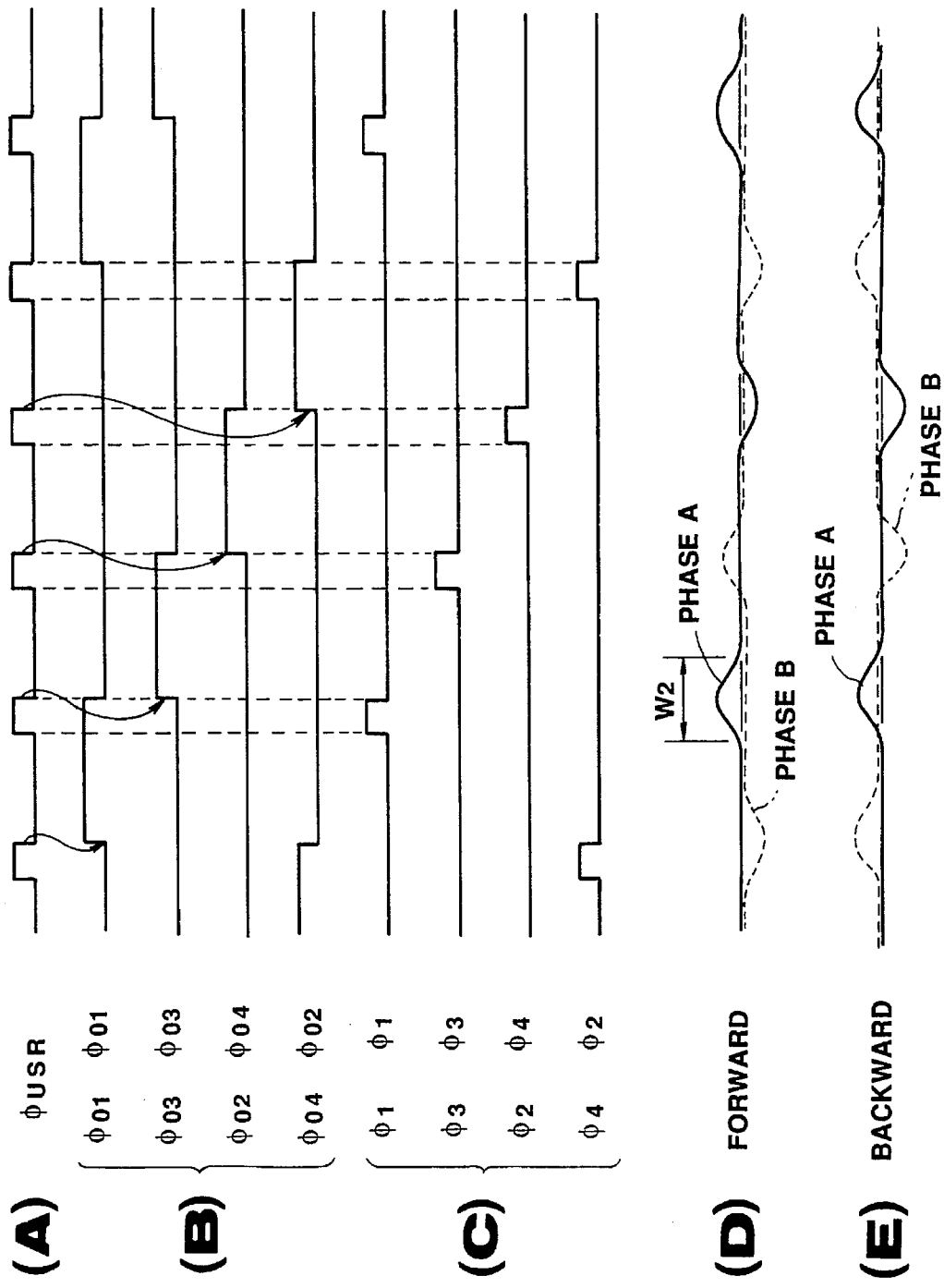
FIG. 10 is a timing chart which illustrates the operation to be performed in the structures shown in FIGS. 7 and 8.

AND gates 66 to 69 calculate the AND between the pulse selection signals φ01 to φ4 and the first digital pulse φ USR so that the pulses φ1 to φ4 are generated in such a manner that the four continuous pulses of φ USR are allocated (see φ1 to φ4 shown in FIGS. 9 and 10). The generation and inhibition of the aforesaid pulses φ1 to φ4 can be controlled in response to drive permission signal USRCT supplied from the LCPU 23. Furthermore, the sequence of the selection of φ2 and φ4 can be changed by means of forward-rotation/reverse-rotation instruction signal USRDIR supplied from the LCPU 23. As a result, the relationship in terms of the phase between the phase A and the phase B in the AC voltage generating circuit can be inverted and therefore the rotational direction can be changed.

A signal generated in the monitor electrode 27 of the supersonic motor 24 becomes VFBO via a waveform shaping circuit (omitted from illustration) and the phase of VFBO is subjected to a comparison with φ1 or φ3 by the D-type flip flop 65 structured as shown in FIG. 7.

When the frequency is fed back so as to make the phase of VFBO is deviate by a predetermined degree from the phase of the AC voltage to be applied, it has been known that the optimum frequency for driving the supersonic motor can be, in general, obtained regardless of a change in the temperature or the like. Therefore, the increase or decrease of the frequency is determined by the LCPU 23 in accordance with the level of VFB.

Figure 8:
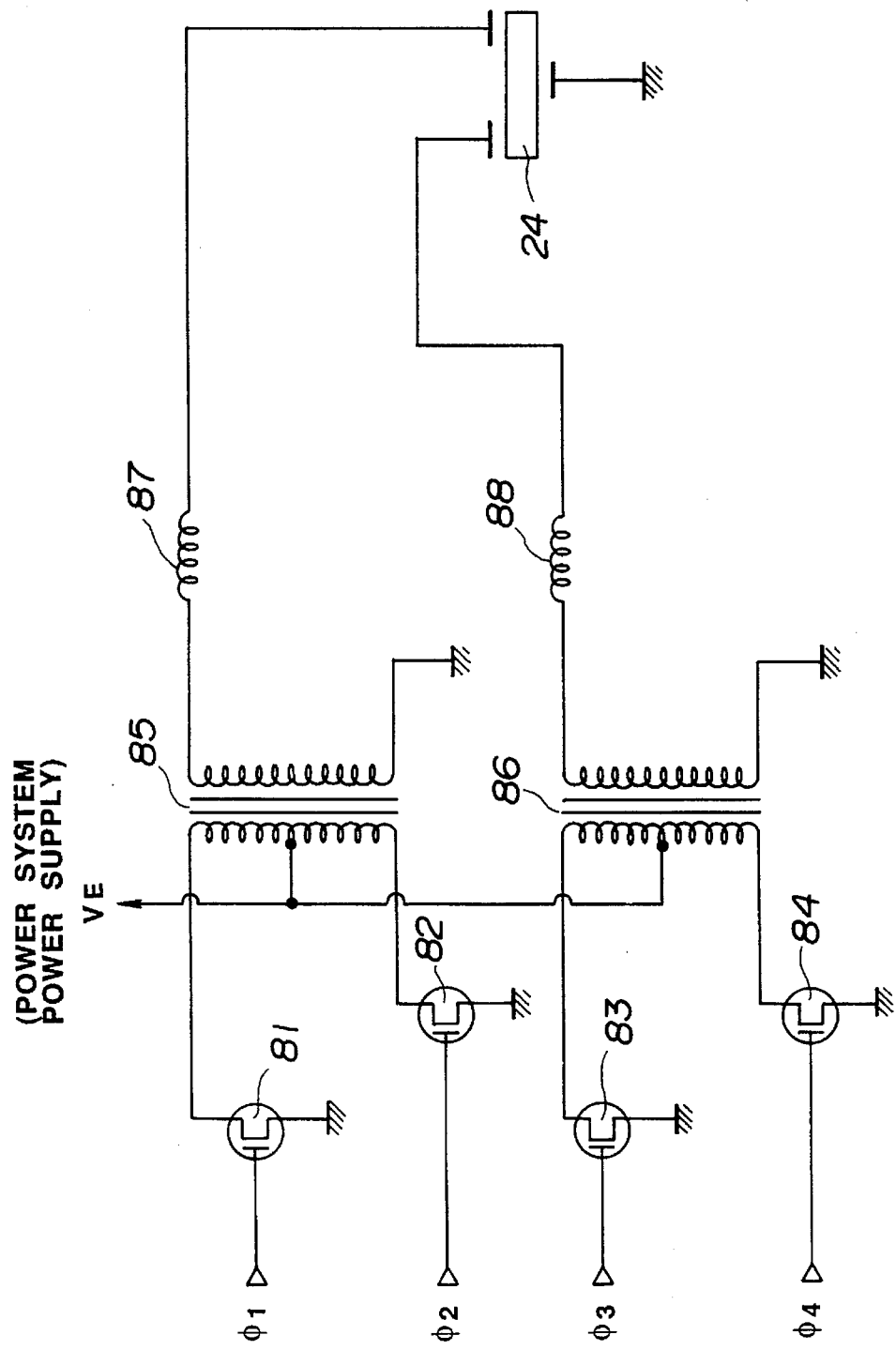
FIG. 8 is a circuit diagram which illustrates a detailed structure of the AC voltage generating means shown in FIG. 3.

FIG. 8 illustrates the AC voltage generating circuit in which the aforesaid digital pulses φ1 to φ4 are supplied to the gates for power MOS FETs 81 to 84 (omitted from illustration) so that the power MOS FET is turned on and electric currents are pulled from transformers 85 and 86 when φ1 to φ4 are "H", the AC voltage generating circuit being a so-called "push-pull" circuit. Series insertion inductances 87 and 88 for performing waveform-shaping are disposed on the secondary sides of the transformers 85 and 86. Furthermore, the extensions from the inductances 87 and 88 are connected to the supersonic motor 24. Since the circuit is structured as described above, the A-phase and B-phase AC voltage shown in FIGS. 9 and 10 are generated in the electrode of the supersonic motor 24.

FIGS. 9 and 10 are timing charts for illustrating the operations of the elements shown in FIGS. 7 and 8. The first digital pulse φ USR shown in FIGS. 9 and 10 (A) has a period of t2 and a pulse width of t3 as described with reference to FIG. 5. By calculating the AND between the first digital pulse φ USR and the pulse selection signals φ01 to φ04 shown in FIGS. 9 and 10 (B), four digital pulses φ1 to φ4 shown in Fight. 9 and 10 (C) can be obtained. In this case, the selection sequence of φ2 and φ4 is changed between the cases of the forward rotation and the reverse rotation in accordance with the logical level H or L of the forward-rotation/reverse-rotation instruction signal USRDIR described with reference to FIG. 7. By means of the aforesaid digital pulses φ1 to φ4, the A-phase and the B-phase AC voltage is obtained as shown in FIGS. 9, 10 (D) and 10 (E).

Symbols W1 and W2 shown in FIGS. 9 and 10 are called the pulse widths of the AC voltage and, when the pulse width is narrowed, electricity to be supplied to the supersonic motor 24 is reduced and the output is also reduced.

Figure 11:
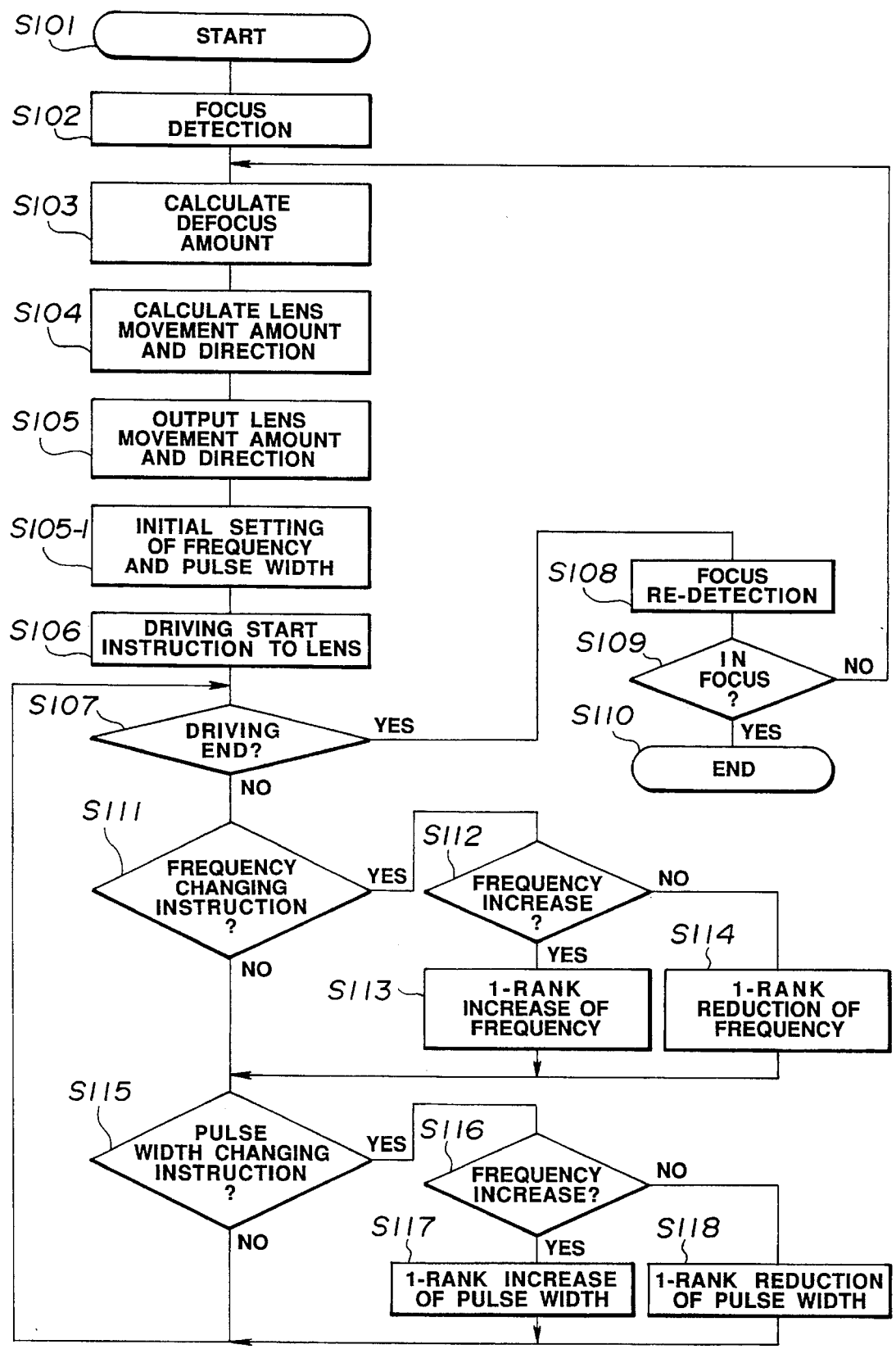
FIG. 11 is a flew chart which illustrates the operation of a BCPU of the camera system according to the second embodiment.
Figure 12:
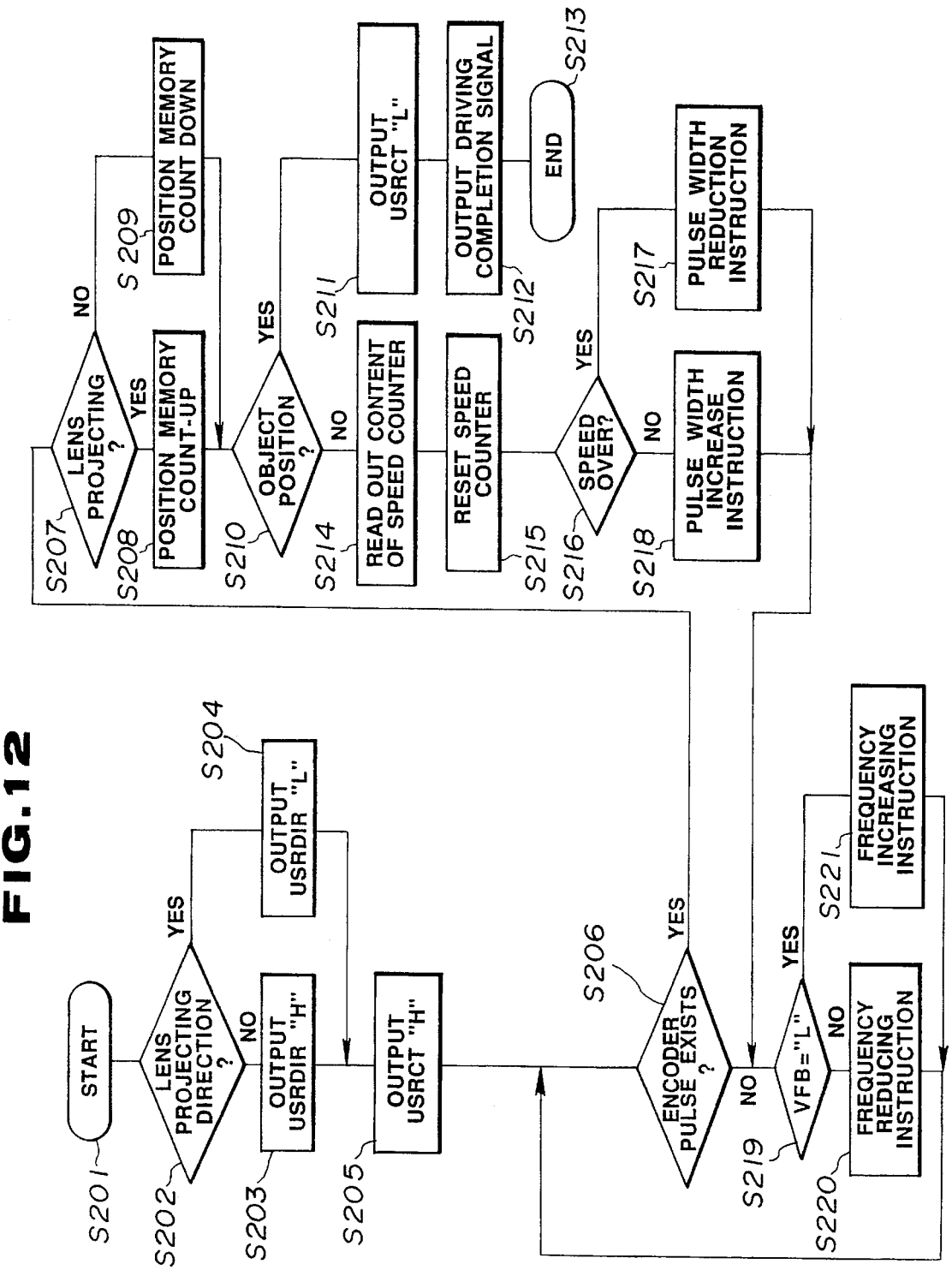
FIG. 12 is a flew chart which illustrates the operation of a LCPU of the camera system according to the second embodiment.
Figure 13:
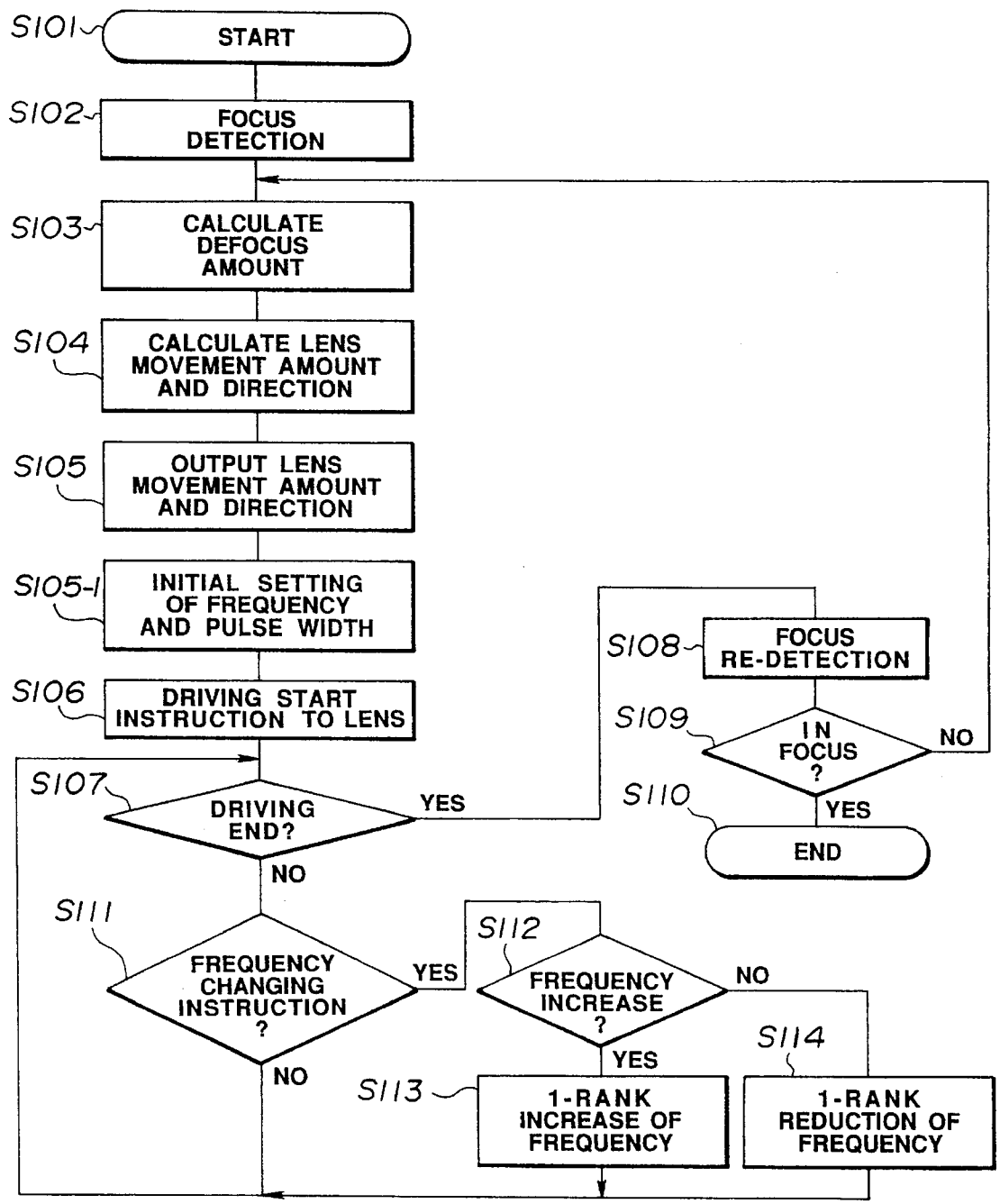
FIG. 13 is a flow chart which illustrates the operation of a BCPU of the camera system according to the third embodiment.
Figure 14:
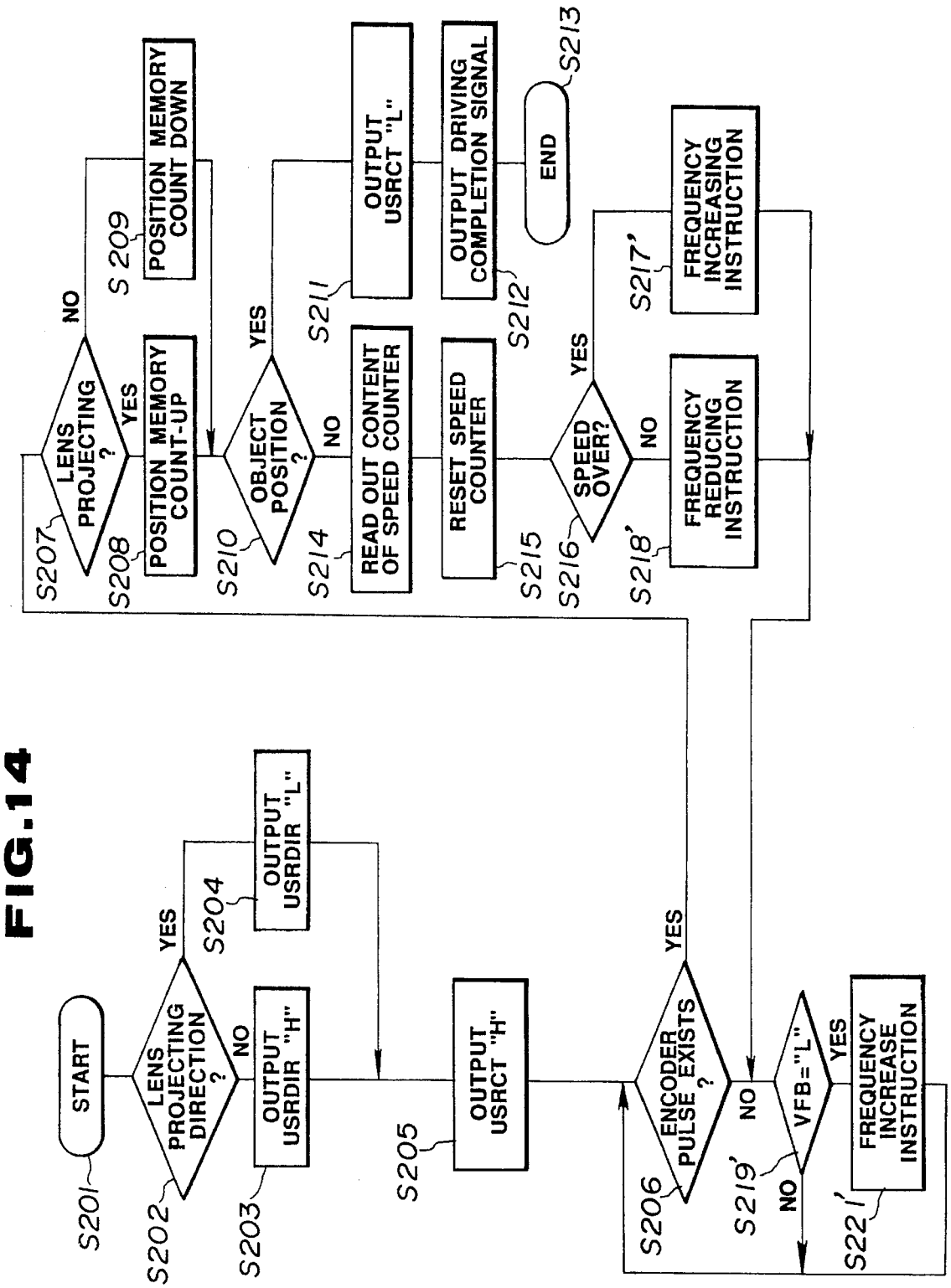
FIG. 14 is a flow chart which illustrates the operation of a LCPU of the camera system according to the third embodiment.

The automatic focusing operation of the thus structured camera system according to the second and the third embodiments will now be described with flow charts shown in FIGS. 11 to 14, where FIGS. 11 and 12 illustrate the second embodiment of the present invention and FIGS. 13 and 14 illustrate the third embodiment. FIGS. 11 and 13 illustrate the flow of the BCPU 13, while FIGS. 12 and 14 illustrate the flow of the LCPU 23.

First, the second embodiment will now be described.

FIG. 11 is a flow chart of the operation of the BCPU 13 when it is in an automatic focus mode. When the release button 31 shown in FIG. 2 is depressed by half its full stroke, the automatic focus mode is realized (step S101). Then, the AF module 35 performs the focal point detection (step S102), and the quantity of the defocus is calculated by the calculation control portion in the BCPU 13 in accordance with the output denoting the result of the focal point detection (step S103).

In the BCPU 13, the quantity and the direction of the movement of the lens are also calculated (step S104). The result of this is transmitted to the lens side by serial communication via the electric contacts 1b to 1d (step S105). In accordance with the initial frequency and PWM data supplied from the lens, the reload registers C01, C11, C21 and C31 are initialized (step S105-1). Then, a command code to commence driving of the lens is transmitted to the lens unit 2 by a similar serial communication (step S106).

Then, a state of waiting for supply of information from the lens unit 2 is realized. First, a discrimination is made as to whether or not the driving completion code has been transmitted (step S107). If it has been transmitted, an operation of re-detecting the focal point is performed (step S108). If the focus state is detected, the automatic focus mode is completed (steps S109 and S110). If the focus state is not detected, the flow returns to step S103.

If a negative discrimination is made in step S107, a discrimination is made as to whether or not the frequency changing instruction code has been transmitted (step S111). If it has been transmitted, the thus made instruction to raise or lower the frequency is detected (step S112). If the instruction of raising the frequency is made, the values of the reload registers C01, C11 and C21 shown in FIG. 4 are rewritten in accordance with FIG. 6 as described above and the values of t0 to t2 are changed, so that the frequency of φ USR corresponding to the four pulses is changed (step S113). If an instruction of lowering the frequency has been made, the values of the reload registers C01, C11 and C21 are rewritten in accordance with FIG. 6 (step S114).

Then, a discrimination is made as to whether or not the pulse width changing instruction code has been transmitted (step S113). If it has been transmitted, the thus made instruction is to raise or lower the pulse width is detected (step S116). If the instruction of raising the pulse width has been made, the value of the reload register C31 shown in FIG. 4 is raised so as to enlarge the pulse width t3 (step S117). If the instruction of lowering the same has been made, the value of the reload register C31 shown in FIG. 4 is decreased so as to reduce t3 (step S118). Then, the flow return to step S107 and the aforesaid cycle is repeated.

FIG. 12 is a flow chart of the operation of the LCPU 23 in its lens driving mode. By receiving information about the direction and the quantity of driving and a command code to commence driving supplied from the BCPU 13 by the serial communication, the lens driving mode is realized (step S201). Then, a discrimination is made as to whether or not the lens driving direction is the direction in which the lens is moved forward (step S202). If the direction is the direction in which the lens is moved forwards, "L" is transmitted to the USRDIR terminal (step S204). If it is not the lens forward-movement direction, "H" is transmitted (step S203).

Then, a USRCT signal which is a drive permission signal is transmitted as "H" (step S205). Then, a discrimination is made as to whether or not the encoder pulse has been transmitted from the encoder processing circuit 26 (step S206). If it has been transmitted, a discrimination is made as to whether or not the direction is the forward-movement direction (step S207). If it is the forward movement direction, the count of the value of a position memory (the address of the memory for memorizing the value denoting the position) is increased (step S208). If it is the retracting direction, the count is decreased (step S209) and the count thus made is again memorized.

Then, a discrimination is made as to whether or not the quantity of driving transmitted previously from the BCPU 13 has been met (step S210). If the lens has been driven by a predetermined quantity and it has reached a desired position, the driving permission signal USRCT is made to be "L" and therefore the outputs of φ1 to φ4 are inhibited (step S211) so that driving of the supersonic motor is stopped. Then, the driving completion code is transmitted to the BCPU 13 via the electric contacts 2b to 2d (step S212). Thus, the driving mode is completed (step S213).

If it has not reached the target position in step S210, the counter value of a velocity counter in the LCPU 23 which is freely running at a predetermined clock is read out (step S214) and the counter is again reset to zero (step S215). Then, a discrimination is made as to whether or not the velocity is higher than a target value in accordance with the read velocity (the pulse interval) (step S216). If it is higher than the target value, a pulse width reduction instruction code is transmitted to the BCPU 13 by the serial communication (step S217). If it is not higher than the same, a pulse width enlargement instruction code is transmitted (step S218).

The term "target velocity" used hereinbefore is meant a relationship between the residual driving pulses and the velocity stored in a ROM of the LCPU 23, the target velocity being a value corresponding to 80 rpm in a state where the number of stage residual pulses is less than 100 and a value corresponding to 10 rpm in a state where the number of the residual pulses is 100 or less.

Then, a discrimination is made as to whether or not the VFB output is "L" (step S219). The fact that the VFB output is "L" means that the phase of the output from the monitor electrode is deviated in a direction which shows the driving frequency is too low. Therefore, a frequency raising instruction code is transmitted to the BCPU 13 by the serial communication (step S221). If it is not "L", a lowering instruction code is transmitted (step S220). Then, the flow returns to step S206.

As described above, according to the second embodiment, the RF oscillator is provided in only the camera body 1, the RF pulse is supplied to only the BCPU 13 which is operated at high speed, and the RF pulse is converted into a relatively low frequency φ USR in the BCPU 13 before it is supplied to the lens unit side. Therefore, the electric current consumption in the high frequency generating and operation portions cannot be increased even if the lens unit is fastened to the system. Therefore, the electric current consumption in the IC system can be significantly reduced. Furthermore, hardware of the lens unit can be simplified and therefore the overall cost can be reduced. Furthermore, the pulse which is the basis of the pulse for driving the supersonic motor is aggregated into one φ USR, it is developed into φ1 to φ4 in the unit, and the instruction of changing the frequency of φ USR or the pulse width is made by using the originally-provided serial communication line which is required to perform communication between units 1 and 2. Therefore, the necessity of increasing the electric contact can be reduced to only the signal line n1 (see FIG. 3) for transmitting φ USR. As a result, the cost can be reduced, the necessity of providing the space for locating a multiplicity of pins can be eliminated and the probability of a defective contact can be lowered, causing the reliability to be improved.

In addition, since the difference between the continuous four pulses of φ USR can be minimized, the distortion of the generated AC voltage can be reduced and satisfactory driving characteristics can be obtained.

Then, the third embodiment will now be described. The third embodiment is arranged in such a manner that the pulse width of the AC voltage is fixed and the velocity control is performed by the frequency. The structure in terms of hardware is substantially the same as that according to the first embodiment. However, the third counter block shown in FIG. 4 is different in such a manner that the elements C31 to C37, I21 and I22 are omitted and P31 is connected to P21.

Furthermore, an inverter is used in place of I33 so that the φ USR is the inverted output of P21 shown in FIG. 5.

FIG. 14 is a flow chart which illustrates a flow of the LCPU 23 for driving the lens. Since steps S201 to S216 are the same as those according to the second embodiment, their descriptions are omitted here. If a discrimination is made step S216 that the velocity is too high, the frequency raising instruction code is transmitted to the BCPU 13 (step S217'). If the velocity is not too high, the lowering instruction code is transmitted (step S218'). Then, VFB is examined and the frequency raising instruction is transmitted to the BCPU 13 if a discrimination is made that VFB is "L". In accordance with this, the flow of the BCPU 13 for the AF operation is arranged as shown in FIG. 13 in such a manner that steps S115 to S118 according to the second embodiment shown in FIG. 11 are omitted.

According to the third embodiment, a fact that locking can easily take place in a case where the driving frequency is too low can be prevented and the velocity control is performed by changing the frequency in the side in which the frequency is high. Therefore, hardware for setting the pulse width can be omitted from the structure and the overall cost can be reduced. In addition, since the operation required to control the pulse width can be omitted, the time taken for the LCPU and BCPU to operate can be shortened and the system thus structured can be adapted to a high speed operation in which the interval of generating encoder pulses is short.

Although the second and the third embodiments are described while using the unit 2 as the lens unit, the present invention is not limited to such an arrangement. The present invention can be applied to various units each including a supersonic motor such as a winder and a strobe. In this case, the supersonic motor is not limited to the annular type motor of the travelling wave type and therefore another type motor such as a linear type motor may, of course, be employed.

According to the above-described embodiments, the following effects can be obtained:

[1] Since the frequency of the voltage to be applied to the supersonic motor is determined by dividing the RF oscillation by the digital counter, a stable frequency can be obtained regardless of the temperature and adjustment and the like can be easily performed.

[2] Since the high frequency operation portions are aggregated in the camera body, the load for the IC type power supply can be reduced.

[3] Since the four types of the pulse required to generate the AC voltage in the unit are aggregated to one type of pulse at the time of transmitting them, the number of the electric contacts which must be added can be reduced. Therefore, the overall cost can be reduced and deterioration in the reliability can be prevented.

[4] Since processing relating to feeding back of the operation of the supersonic motor is performed in the lens and the above-mentioned information is, driving parameter changing information, transmitted to the camera body by an original information changing means, the additional electric contacts are not required and the information to be transmitted can be minimized.

Then, a fourth embodiment of the present invention will now be described.

Figure 15:
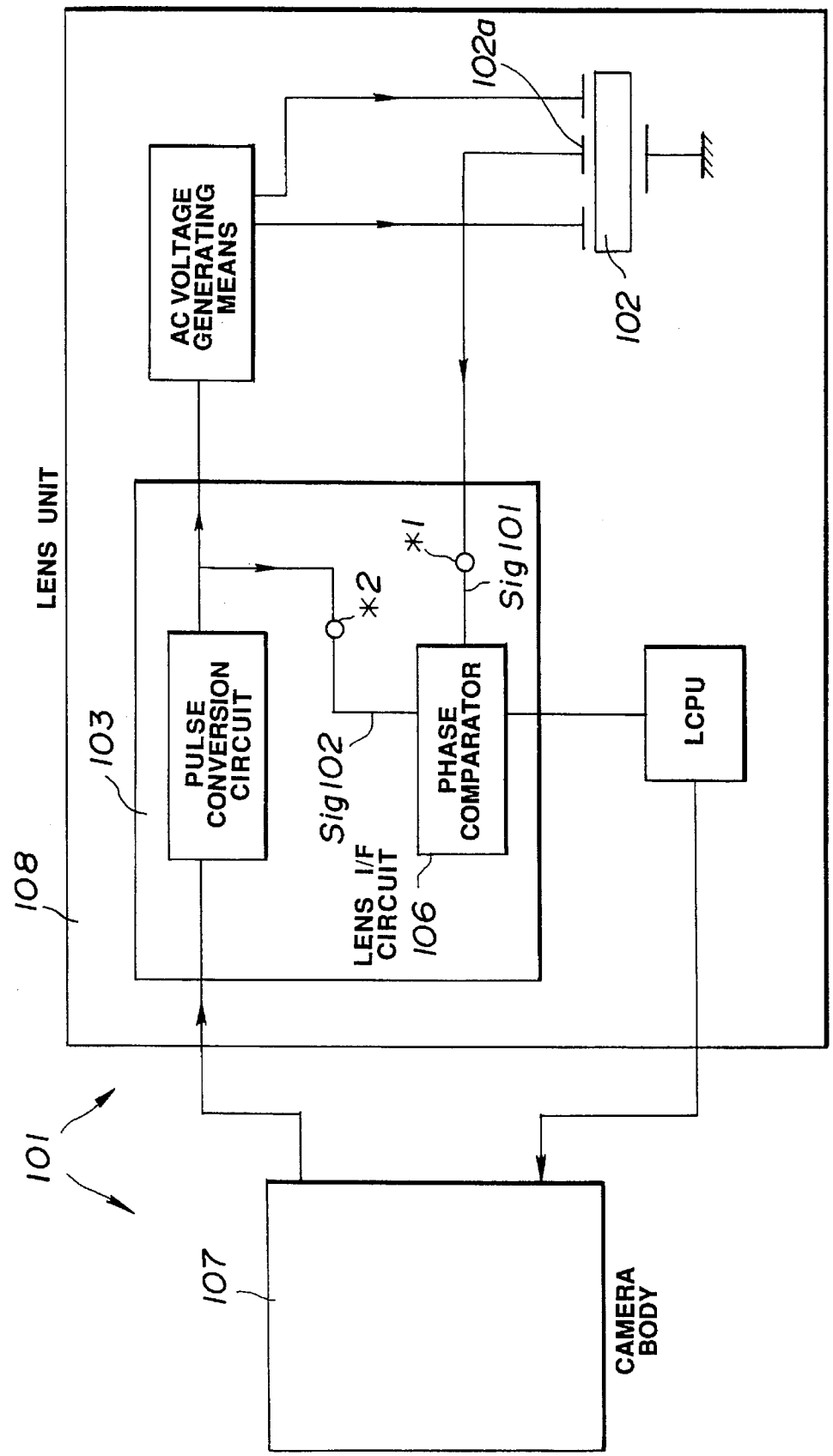
FIG. 15 is a block diagram which illustrates a monitor signal processing system of a supersonic motor driving circuit of a camera system according to a fourth embodiment of the present invention.

FIG. 15 is a block diagram which illustrates a monitor signal processing system of a supersonic motor driving circuit of a camera system according to the fourth embodiment.

As shown in FIG. 15, a driving circuit 101 for a supersonic motor 102 is composed of a driving circuit 107 in the camera body and a circuit 108 in the lens unit, the circuit 108 being operated in response to the basic pulse signal φ USR transmitted from the driving circuit 107. A system for processing monitor signal Sig 101 in the driving circuit 108 in the lens unit has a phase comparator 106 serving as a monitor output phase discriminating means which processes any one of the first to the fourth pulse signals selected from the basic pulse signal φ USR in the I/F circuit 103 as a comparison timing pulse signal Sig 102.

In the case of the fourth embodiment, there is a fear that the optimum frequency feedback cannot be effected if the monitor electrode 102a is not accurately and suitably positioned in the supersonic motor 102 because the phase comparison timing is limited. If the positions of the monitor electrodes 102a scatter, the timing of the phase comparison must be finely adjusted by providing a delay generating circuit in the signal input system of the phase comparator 106, that is, at positions *1 and *2 of FIG. 15.

The delay generating circuit may be structured in such a manner that the RF pulse is divided in the driving circuit 108 in the lens unit. As an alternative to this, a method may be employed in which the phase comparison timing signal is generated in the driving circuit 107 in the camera body similar to the above-mentioned basic pulse signal φ USR and the phase comparison timing signal is transmitted to the circuit 108 in the lens unit.

Then, a fifth embodiment of the present invention will now be described.

A camera system according to the fifth embodiment is characterized in that the most suitable phase comparison timing information is stored by a storage means and the pulse width of the basic pulse signal is determined by a basic pulse signal generating means in accordance with the stored information.

Figure 16:
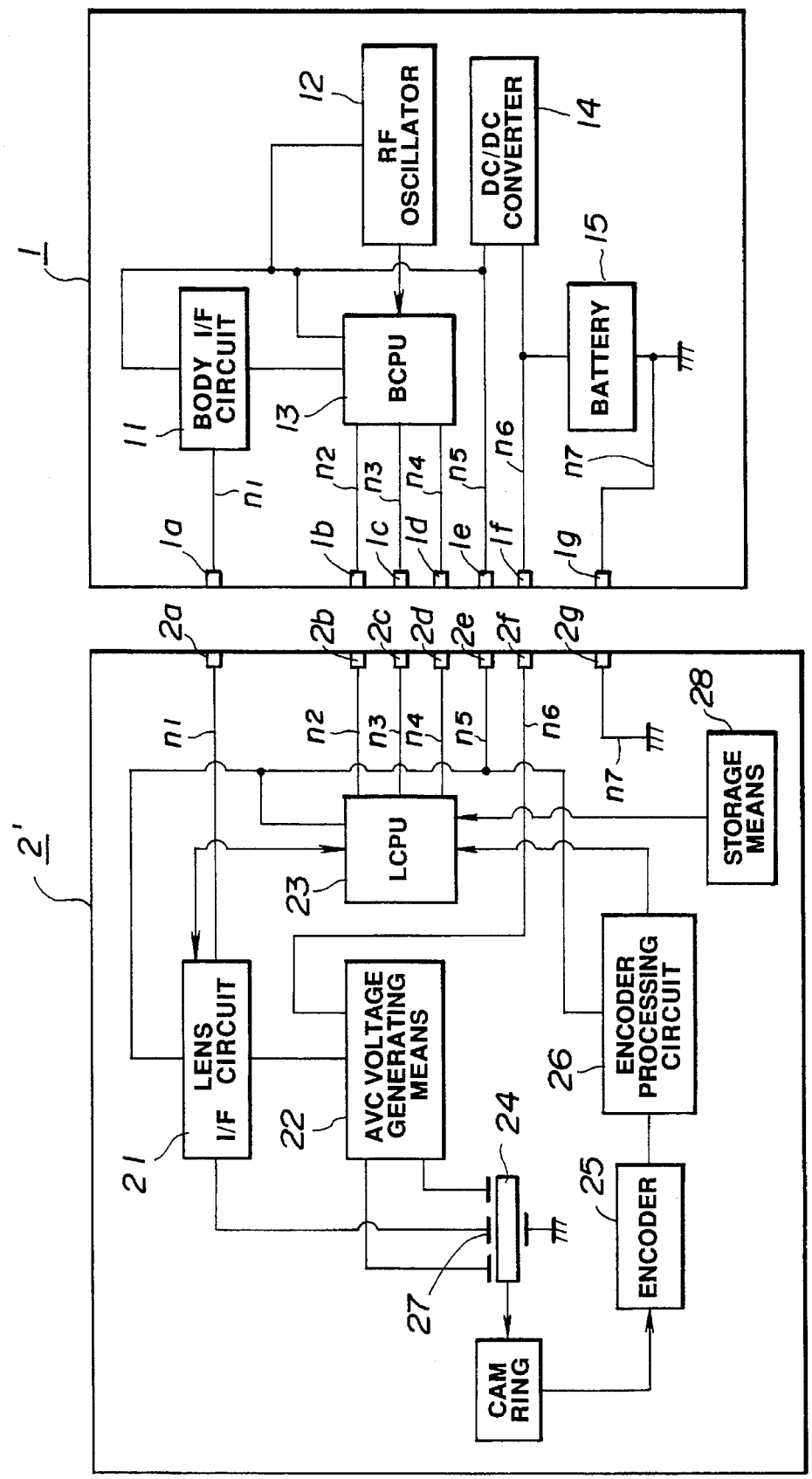
FIG. 16 is a block diagram which illustrates the main structure of an electronic circuit of a fifth embodiment of a camera system according to the present invention.

FIG. 16 is a block diagram which illustrates the main structure of the camera system according to the fifth embodiment. As shown in FIG. 16, the camera system according to the fifth embodiment is structured similar to the camera system according to the second and the third embodiments and therefore only the different points will now be described.

As shown in FIG. 16, a lens unit 2'0 has a storage means 28 for storing data which corresponds to the phase comparison timing in addition to the structure of the lens unit 2 shown in FIG. 3.

Then, the way of changing the frequency of the pulse signal φ USR generated by the basic pulse signal generating means composed of the body I/F circuit 11 and the BCPU 13 (see FIG. 16) according to the fifth embodiment will now be described while invoking FIG. 6. As will be described later, the continuous four pulses of φ USR become φ1' to φ4' pulses shown in FIG. 18 so that the A-phase and B-phase AC voltage for driving the supersonic motor is generated by a push-pull circuit arranged as shown in FIG. 8. Although the frequency of the above-mentioned voltage is determined by t0, the difference in the period of each pulse of φ USR will deform the waveform of the A-phase and B-phase of the AC voltage and driving is affected adversely. Therefore, the scattering of t2 must be minimized. Therefore, the frequency is changed in accordance with the following sequence arranged as shown in FIG. 6.

That is, similar to the above-described second and the third embodiments, in a case where the output from the EXCLUSIVE-OR gate I22 shown in FIG. 4, that is, the input signal P22 to be supplied to the third counter block is as shown in FIG. 6 (E), the frequency is lowered by making the value supplied from the calculation control portion of the BCPU 13 and to be written to the reload register C01 to be +1. That is, t0 shown in FIG. 5 is increased by one pulse so that the pulse 53 is shifted to the right by one pulse as shown in FIG. 6 (D) and becomes the pulse 54. Similarly, t0 and t1 respectively are increased by one pulse as shown in FIG. 6 (C), t0 and t2 respectively are increased by one pulse as shown in FIG. 6 (B) and t0 and t1 respectively are increased by one pulse as shown in FIG. 6 (A) so that the frequency f can be lowered while preventing the excessive deformation of the waveform of the AC voltage.

If the frequency f is raised, t0 and t1 respectively are decreased by one pulse as shown in FIG. 6 (F), t0 and t2 respectively are decreased by one pulse as shown in FIG. 6 (G), t0 and t1 respectively are decreased by one pulse as shown in FIG. 6 (H), and finally t0 is decreased by one pulse as shown in FIG. 6 (I). As a result of the thus arranged changing sequence, the difference in t2 can be smaller than the period f2 and therefore driving can be performed stably. The above-described operation is performed similar to that according to the above-mentioned second and the third embodiments.

Then, the aforesaid electric circuit included in the lens unit 2' (see FIG. 16) will now be described in detail.

Figure 17:
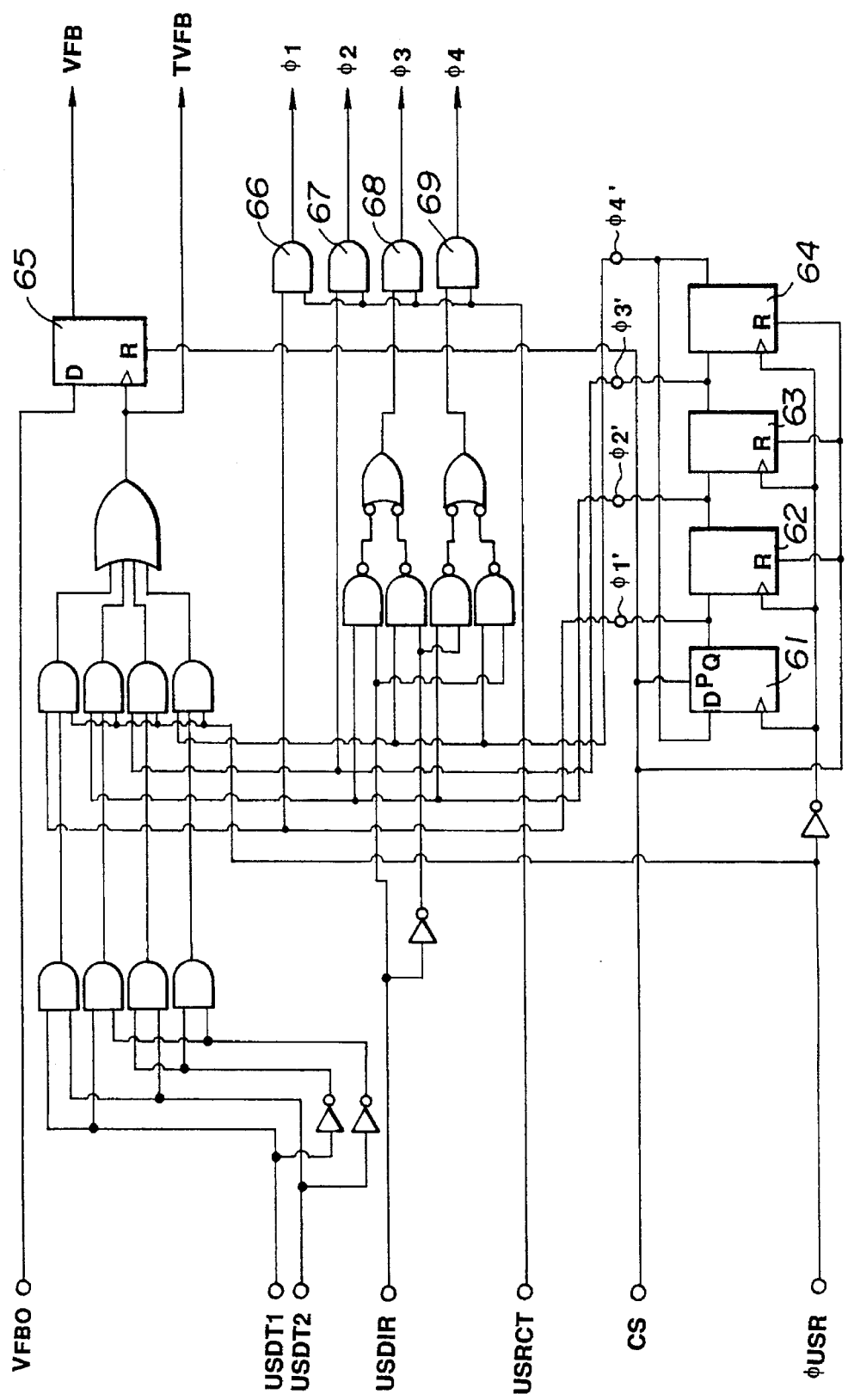
FIG. 17 illustrates a logical circuit for forming four types of digital pulses required to drive the motor from the pulse signal according to the fifth embodiment.

FIG. 17 illustrates a portion of the lens I/F circuit 21 (see FIG. 16). In this block, 4-phase digital pulses φ1 to φ4 are formed from the first digital pulse φ USR. The φ USR is converted into 4-phase driving pulses φ1' to φ4' by a shift register or the like composed of the four D flip-flops 61 to 64 (see FIG. 18). The level of each of the aforesaid driving pulses φ1' to φ4' is "H" in a period from the last transition of the continuous four pulses to the next first transition of φ USR. The generation and inhibition of the aforesaid pulses φ1 to φ4 can be performed in response to drive permission signal USRCT supplied from the LCPU 23. Furthermore, sequence of the selection of φ2 and φ4 can be changed by means of the forward-rotation/reverse-rotation instruction signal USRDIR supplied from the LCPU 23. As a result, the relationship in terms of the phase between the phase A and the phase B in the AC voltage generating circuit can be inverted and therefore the rotational direction can be changed.

Figure 18:
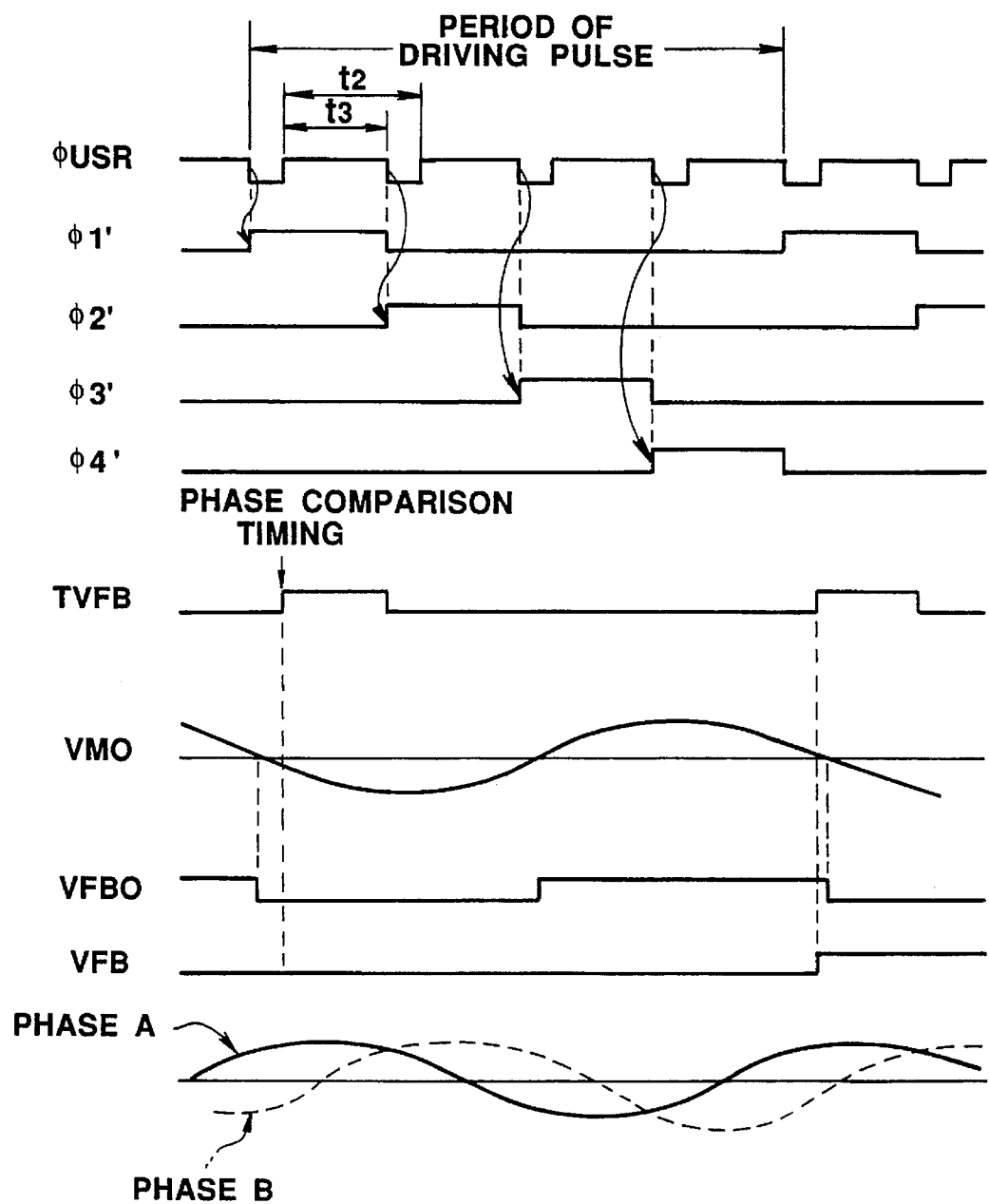
FIG. 18 is a timing chart which illustrates an example of AC voltage to be applied to the electrode of a supersonic motor according to the fifth embodiment.

Signal VMO (see FIG. 18) generated by the monitor electrode 27 of the supersonic motor 24 becomes signal VFBO (see FIG. 18) by means of a waveform shaping circuit (omitted from illustration) and is discriminated to be "H" or "L" by the D flip-flop 65 at the timing of the first transition of a comparison timing signal TVFB before it is latched. As shown in FIG. 18, if "H" is latched, the phase of the signal VMO is delayed from the phase of the comparison timing. If "L" is latched, the phase of the signal VMO is advanced.

As described above, it is known that, if the frequency is fed back in such a manner that the phase of the signal VFBO is deviated by a predetermined degree from the phase of the AC voltage to be applied, the optimum frequency for driving the supersonic motor can be obtained regardless of the change in the temperature or the like. Another fact is also known that it is preferable that, in a case where the frequency is shifted from the aforesaid optimum driving frequency in order to control the velocity, the frequency be shifted so as to be raised from the above-mentioned frequency. If the structure according to this embodiment is arranged in such a manner that the phase is advanced when the frequency is raised, raising or lowering the frequency is determined by the LCPU 23 in a range in which the advance of the phase of the signal VFBO exceeding a predetermined degree from the phase of the AC voltage to be applied is prevented.

Figure 19:
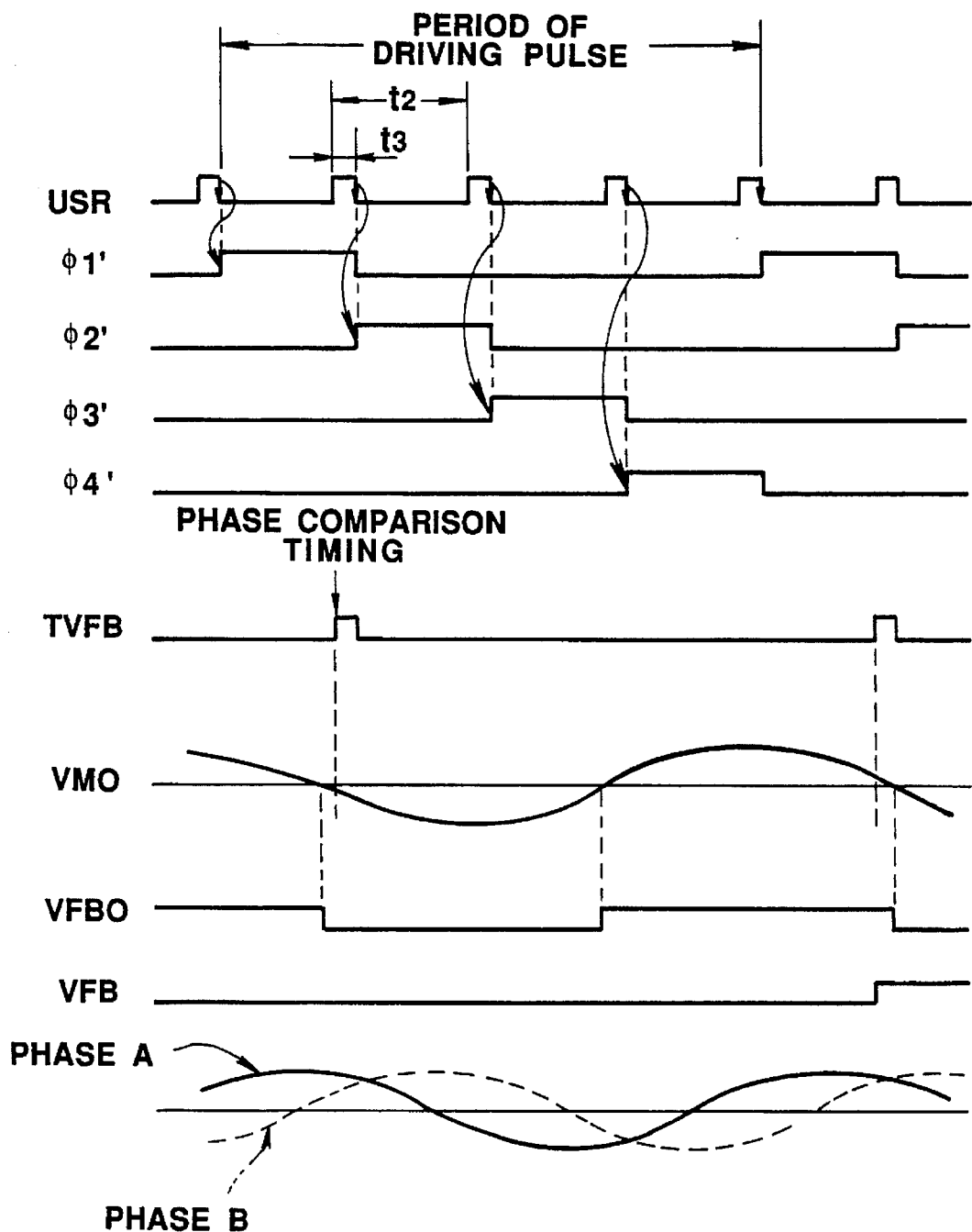
FIG. 19 is a timing chart which illustrates another example of the AC voltage to be applied to the electrode of the supersonic motor according to the fifth embodiment.

The AC voltage generating circuit according to the fifth embodiment is arranged to be equivalent to the circuit shown in FIG. 8. That is, the aforesaid digital pulses φ1 to φ4 are supplied to the gate electrodes of the power MOSFETs 81 to 84 so that the power MOSFETs are turned on and electric currents are pulled from transformers 85 and 86 when φ1 to φ4 are "H", the AC voltage generating circuit being a so-called "push-pull" circuit. Series inductances 87 and 88 for performing waveform-shaping are inserted into the secondary sides of the transformers 85 and 86. Furthermore, the extensions from the inductances 87 and 88 are connected to the electrodes of the supersonic motor 24. Since the circuit is structured as described above, the A-phase and B-phase AC voltage shown in FIGS. 18 and 19 are applied to the electrode of the supersonic motor 24.

Then, the phase comparison timing pulse TVFB for the monitor signal will now be described in detail. It is preferable that the phase comparison timing be the optimum values for the forward rotation and the reverse rotation for each motor due to the manufacturing scattering of the motors. Therefore, according to the fifth embodiment, the supersonic motor in the unit is actually operated and the obtained data about the optimum phase comparison timing is previously written to the above-mentioned storage means 28 (see FIG. 16).

Figure 20:
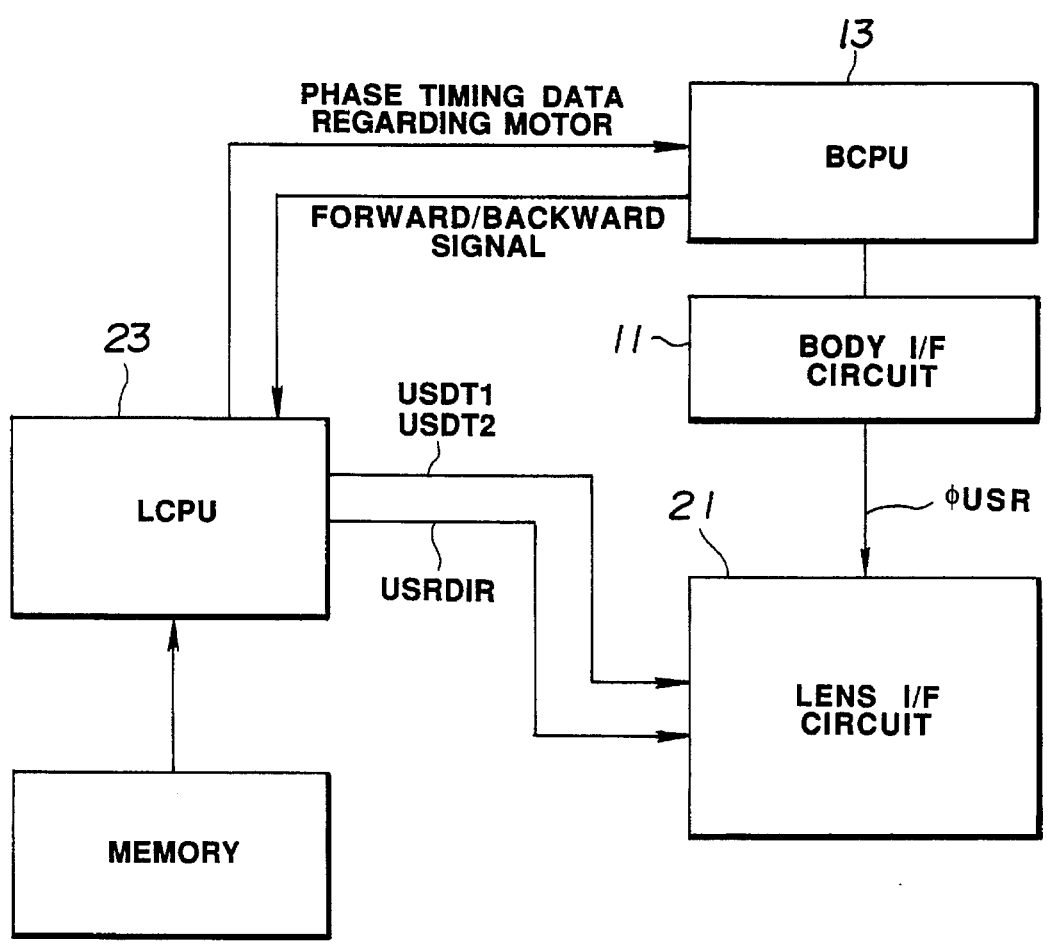
FIG. 20 is a block diagram which illustrates the flow of data of a phase comparison timing signal according to the fifth embodiment.

FIG. 20 illustrates the flow of data relating to the above-mentioned phase comparison timing. According to the fifth embodiment, the first transition of φ USR at any one of the timing of φ1 to φ4 is employed as the above-described timing. Therefore, the following factors are required:

<1> discrimination of φ1 to φ4 which contains the aforesaid timing;

<2> discrimination of the timing in the selected range which includes the aforesaid timing.

Figure 21:
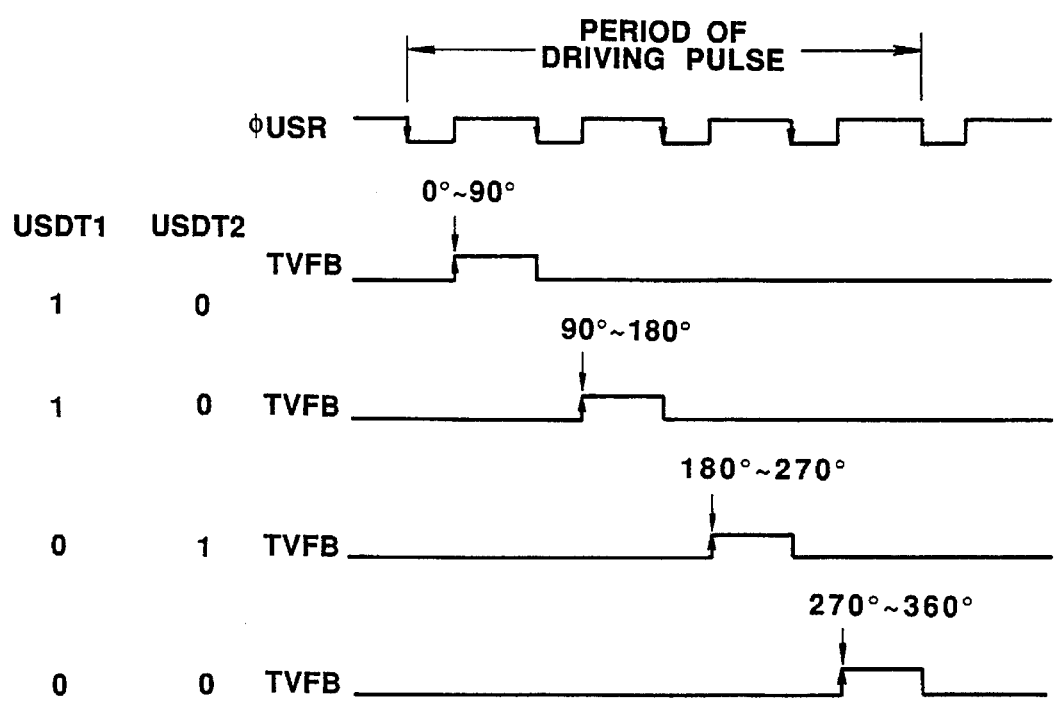
FIG. 21 is a timing chart which illustrates the relationship between the phase comparison timing signal and a phase timing selection signal according to the fifth embodiment.

As for <1>, it is selected by combining data of USDT1 and USDT2 shown in FIG. 17. That is, as shown in FIG. 21, when USDT1=1. USDT2=1, timing φ1 (0° to 90° of one period, that is 360°) is selected, when USDT=1. USDT2=0, timing φ3 (90° to 180°) is selected, when USDT1=0. USDT2=1, timing φ2 (180° to 270°) is selected, and when USDT1=0, USDT2 timing φ4 (270° to 360°) is selected. The aforesaid range is determined by the circuit shown in FIG. 17 in such a manner that the LCPU 23 reads out data in the memory in accordance with forward-rotation/reverse rotation information supplied from the BCPU 13 so as to transmit data of USDT1 and USDT2 relating to the subject rotational direction to the I/F circuit 21. As for <2>, it is determined in accordance with the pulse width of φ USR. Therefore, the pulse width of φ USR is determined by the BCPU 13 and the body I/F circuit in accordance with data in the memory supplied via the LCPU and the φ USR signal is transmitted to the lens I/F circuit. Thus, by utilizing the pulse width of φ USR, the phase comparison timing exhibiting high resolution can be determined.

Then, the automatic focusing operation performed by the thus constituted camera system according to the fifth embodiment will now be described with reference to a flow chart shown in FIG. 22.

Figure 22:
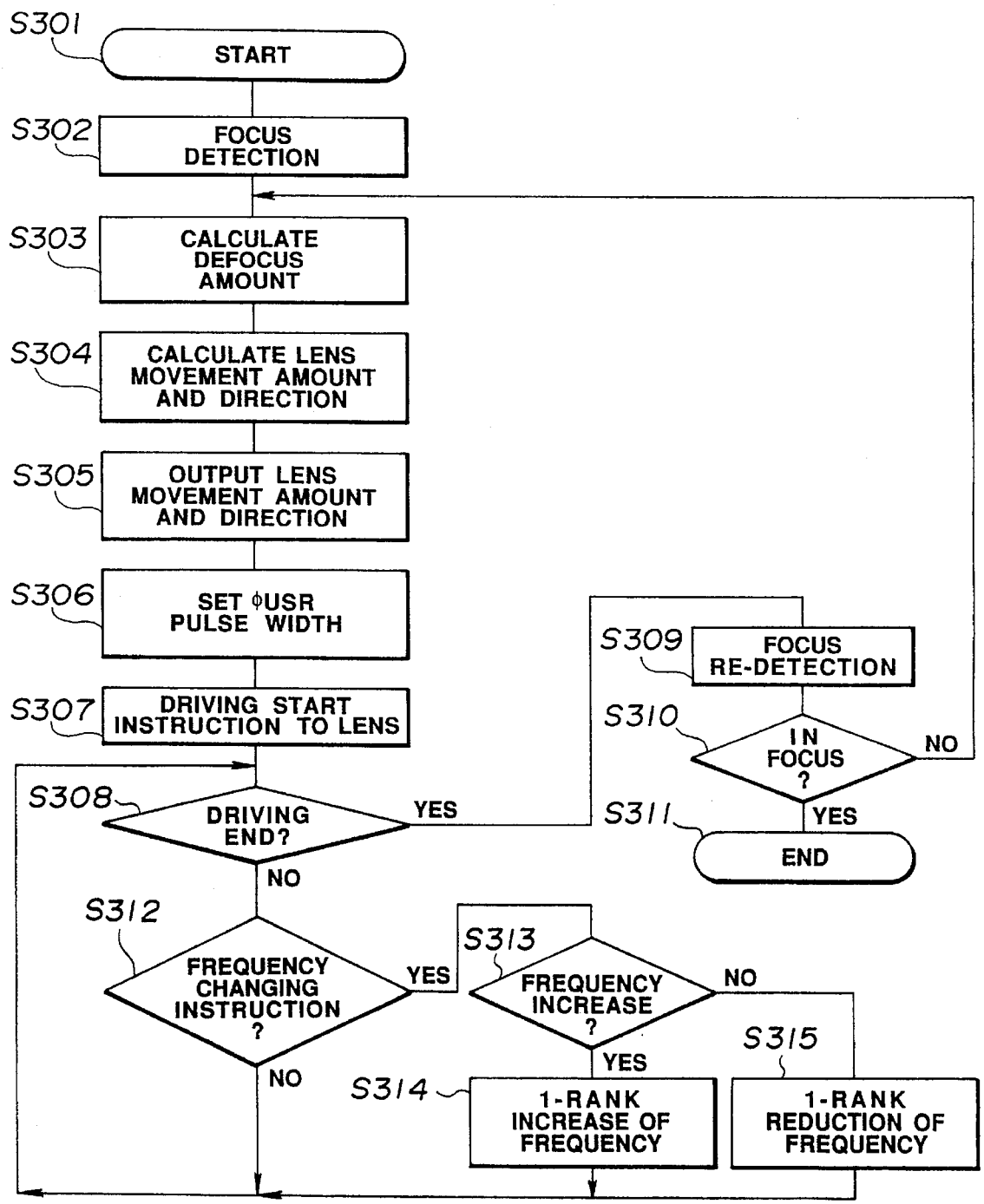
FIG. 22 is a flow chart which illustrates the operation of a CPU in the camera body in the automatic focusing state according to the fifth embodiment.

FIG. 22 is a flow chart of the operation to be performed by the BCPU 13 in the automatic focus mode. Prior to starting this mode, the above-mentioned phase comparison data at the time of the forward-rotation/reverse-rotation is previously read out from the storage means 28 by the LCPU 23 (see FIG. 20) and it is stored in the BCPU 13 (see FIG. 20).

When the release button 31 shown in FIG. 2 is depressed by half, the automatic focus mode is realized (step S301). Then, the AF module 35 performs the focal point detection (step S302), and the quantity of the defocus is calculated by the calculation control portion in the BCPU 13 in accordance with the output denoting the result of the focal point detection (step S303).

In the BCPU 13, also the quantity and the direction of the movement of the lens are calculated (step S304). The result of this is transmitted to the lens side by the serial communication via the electric contacts 1b to 1d (step S305). The φ USR is transmitted with the pulse width which corresponds to the phase comparison timing data which has been previously stored as described above (step S306). Then, a command code to commence driving of the lens is transmitted to the lens unit 2' by similar serial communication (step S307).

Then, a state of waiting for supply of information from the lens unit 2' is realized. First, a discrimination is made as to whether or not the driving completion code has been transmitted (step S308). If it has been transmitted, an operation of re-detecting the focal point is performed (step S309). If the focus state is detected, the automatic focus mode is completed (steps S310 and S311). If the focus state is not detected, the flow returns to step S303.

If a negative discrimination is made in step S308, a discrimination is made as to whether or not the frequency changing instruction code has been transmitted (step S312). If it has been transmitted, whether the thus made instruction is to raise or lower the frequency is detected (step S313). If the instruction of raising the frequency is made, the values of the reload registers C01, C11 and C21 shown in FIG. 4 are rewritten in accordance with FIG. 6 as described above and the values of t0 to t2 are changed, so that the frequency of φ USR corresponding to the four pulses is changed (step S314). If an instruction of lowering the frequency has been made, the values of the reload registers C01, C11 and C21 are rewritten in accordance with FIG. 6 (step S315).

Figure 23:
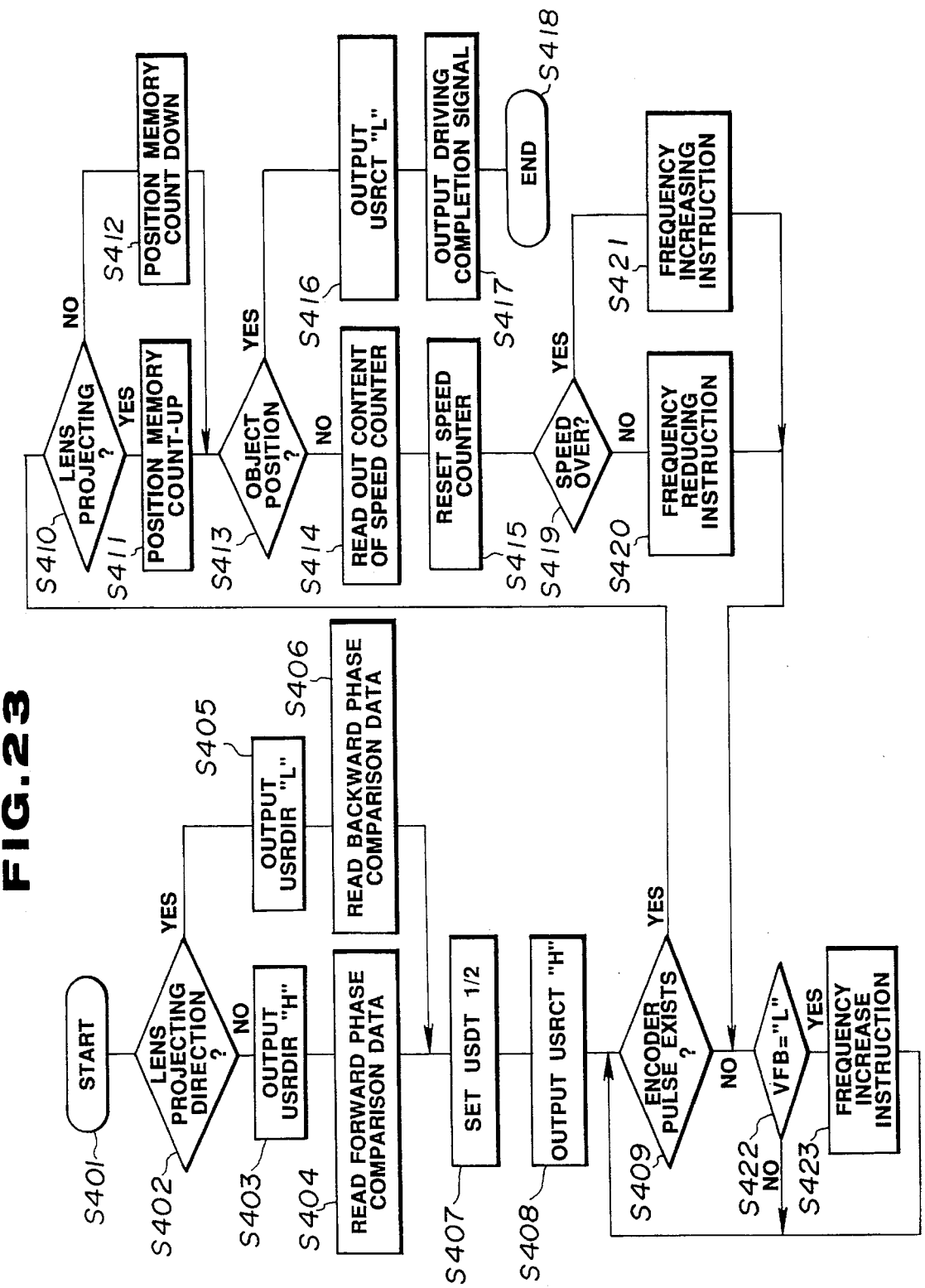
FIG. 23 is a flow chart which illustrates the operation of a CPU in the lens body in the automatic focusing state according to the fifth embodiment.

FIG. 23 is a flow chart of the operation of the LCPU 23 in its lens driving mode. By receiving information about the direction and the quantity of driving and a command code to commence driving supplied from the BCPU 13 by the serial communication, the lens driving mode is realized (step S401). Then, a discrimination is made as to whether or not the lens driving direction is the direction in which the lens is moved forward (step S402). If the direction is the direction in which the lens is moved forward, "L" is transmitted to the USRDIR (step S405) and phase comparison data at the time of the reverse rotation is read out from the memory (step S406). If it is not the lens forward-movement direction, "H" is transmitted to the USRDIR (step S403) and phase comparison data at the time of the forward rotation is read out (step S404). In accordance with data thus read, the USDT1 and USDT2 are set (step S407).

Then, USRCT signal which is a drive permission signal is transmitted as "H" (step S408). Then, a discrimination is made as to whether or not the encoder pulse has been transmitted from the encoder processing circuit 26 (step S409).

If it has been transmitted, a discrimination is made as to whether or not the direction is the forward-movement direction (step S410). If it is the forward movement direction, the count of the value of a position memory (the address of the memory for memorizing the value denoting the position) is increased (step S411). If it is the retracting direction, the count is decreased (step S412) and the count thus made is again memorized.

Then, a discrimination is made as to whether or not the quantity of driving transmitted previously from the BCPU 13 has been met (step S413). If the lens has been driven by a predetermined quantity and it has reached a desired position, the driving permission signal USRCT is made to be "L" and therefore the outputs of φ1 to φ4 are inhibited (step S416) so that driving of the supersonic motor is stopped. Then, the driving completion code is transmitted to the BCPU 13 via the electric contacts 2b to 2d (step S417). Thus, the driving mode is completed (step S418).

If it has not reached the target position in step S410, the counter value of a velocity counter in the LCPU 23 which is freely running at a predetermined clock is read out (step S414) and the counter is again reset to zero (step S415). Then, a discrimination is made as to whether or not the velocity is higher than a target value in accordance with the read velocity (the pulse interval) (step S419). If it is higher than the target value, a frequency raising instruction code is transmitted to the BCPU 13 by the serial communication (step S421). If it is not higher than the same, a frequency lowering instruction code is transmitted (step S420).

The term "target velocity" used hereinbefore is meant a relationship between the residual driving pulses and the velocity stored in a ROM of the LCPU 23, the target velocity being a value corresponding to 80 rpm in a state where the number of the residual pulses is less than 100 and a value corresponding to 10 rpm in a state where the number of the residual pulses is 100 or less.

Then, a discrimination is made as to whether or not the VFB output is "L" (step S422). The fact that the VFB output is "L" means that the phase of the output from the monitor electrode is deviated in a direction which shows the driving frequency is too low. Therefore, a frequency raising instruction code is transmitted to the BCPU 13 by the serial communication (step S423). Then, the flow returns to step S409.

As described above, according to the fifth embodiment, the phase discrimination timing is set by using the pulse width of φ USR in the camera system structured in such a manner that the RF oscillator is provided in only the camera body 1, the RF pulse is supplied to only the BCPU 13 which is operated at high speed, the RF pulse is converted into a relatively low frequency φ USR in the BCPU 13 before it is supplied to the lens unit side, therefore increase in the electric current consumption due to the high frequency operation required in a case where the lens unit is mounted can be prevented and only one signal pin is required to be added. Therefore, the phase comparison timing can be set to an arbitrary phase in 360° while revealing a high resolution.

Then, a sixth embodiment of the present invention will now be described.

The sixth embodiment is arranged in order to reliably transmit f USR while eliminating a necessity of using any strong output buffer even if the transmission passage for φ USR is long and the capacity is large.

Although the structure of the sixth embodiment is substantially the same as that according to the fifth embodiment, the lens I/F circuit and the flow at the time of the operation are different.

Figure 24:
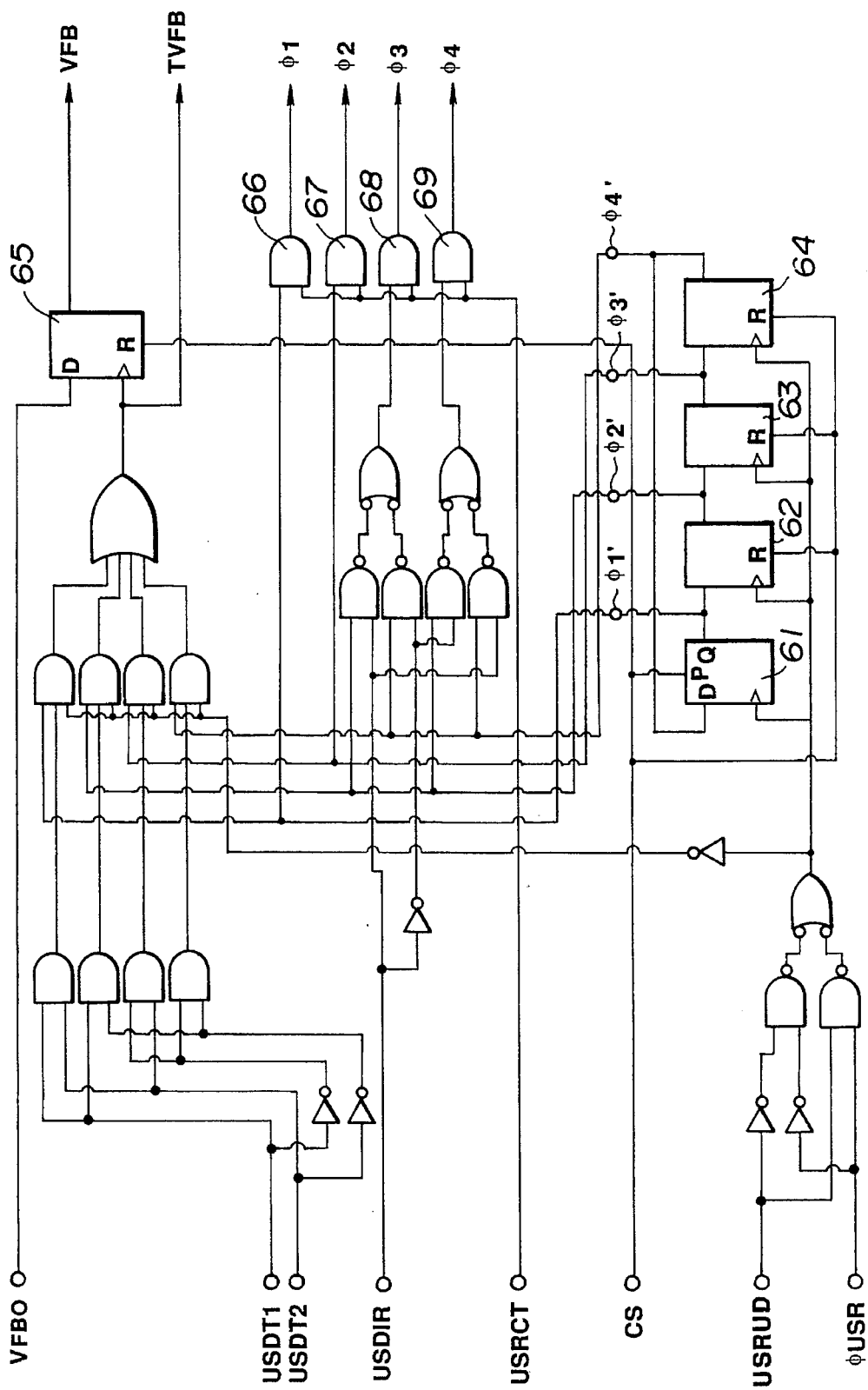
FIG. 24 is a logical circuit view which illustrates a portion of a lens I/F circuit of a sixth embodiment of the camera system according to the present invention.

FIG. 24 illustrates a lens I/F circuit according to the sixth embodiment. In contrast with the lens I/F circuit (see FIG. 17) according to the fifth embodiment, a circuit to which input signal USRUD is supplied and which selects the first transition edge and the last transition edge of φ USR is provided.

Then, the difference between the first transition characteristics and the last transition characteristics of the digital pulse will now be described.

Figure 26:
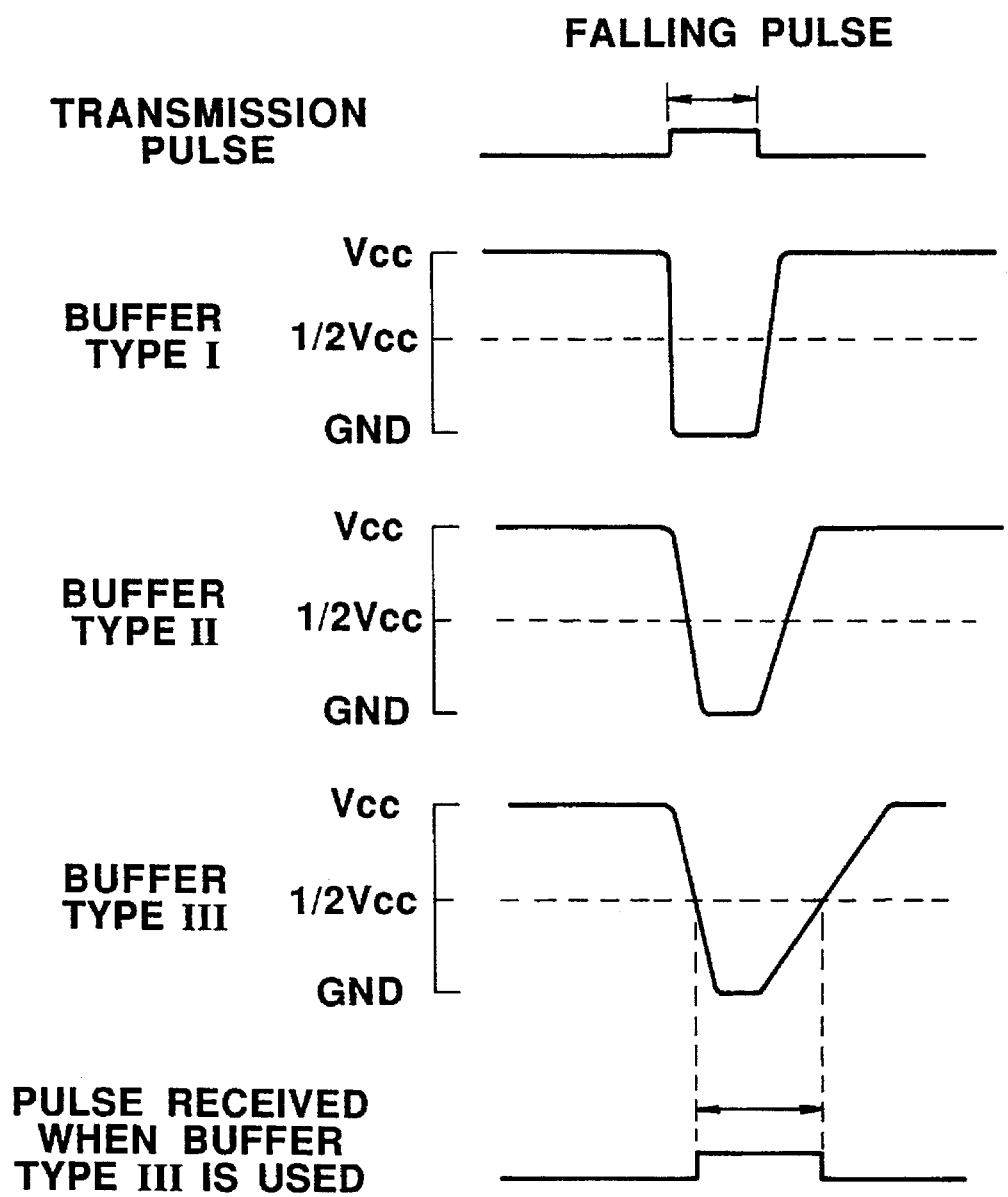
FIG. 26 is a graph which illustrate the pulse waveforms in a case where the basic pulse signal is selected with the last transition pulse according to the sixth embodiment.

FIGS. 25 and 26 respectively illustrate a case in which a digital pulse having a short width is transmitted at the first transition pulse (FIG. 25) and a case in which the same is transmitted at the last transition pulse (FIG. 26).

In general, the output of an IC or the like constituted by a C-MOS structure is composed of a P-MOS transistor and an N-MOS transistor. However, since the driving performance of the P-MOS transistor is inferior to that of the N-MOS transistor, the last transition is completed in a short time. For example, in a case where outputs are performed by three types of buffers I, II and III having different drive performance, both the first transition and the last transition are correctly transmitted with type I. However, the time transmitted as "H" becomes 0 in the type III and therefore the unit portion cannot be operated. That is, if the parasitic capacity of the wiring is large, it is preferable to use the last transition pulse because the pulse can be safely and reliably transmitted by a buffer having a usual driving performance.

The sixth embodiment is arranged as follows:

<1> In a case where f USR is transmitted via signal pins through a route the capacity of which will easily be enlarged;

<2> There is a probability for φ USR to require the phase comparison timing having a phase angle which is slightly smaller than 90°, 180°, 270° and 360° at which the first transition period becomes excessively short; and <3> In a case where the performance of the output buffer is not excellent significantly, φ USR can be safely and reliably transmitted to the unit portion.

Figure 27:
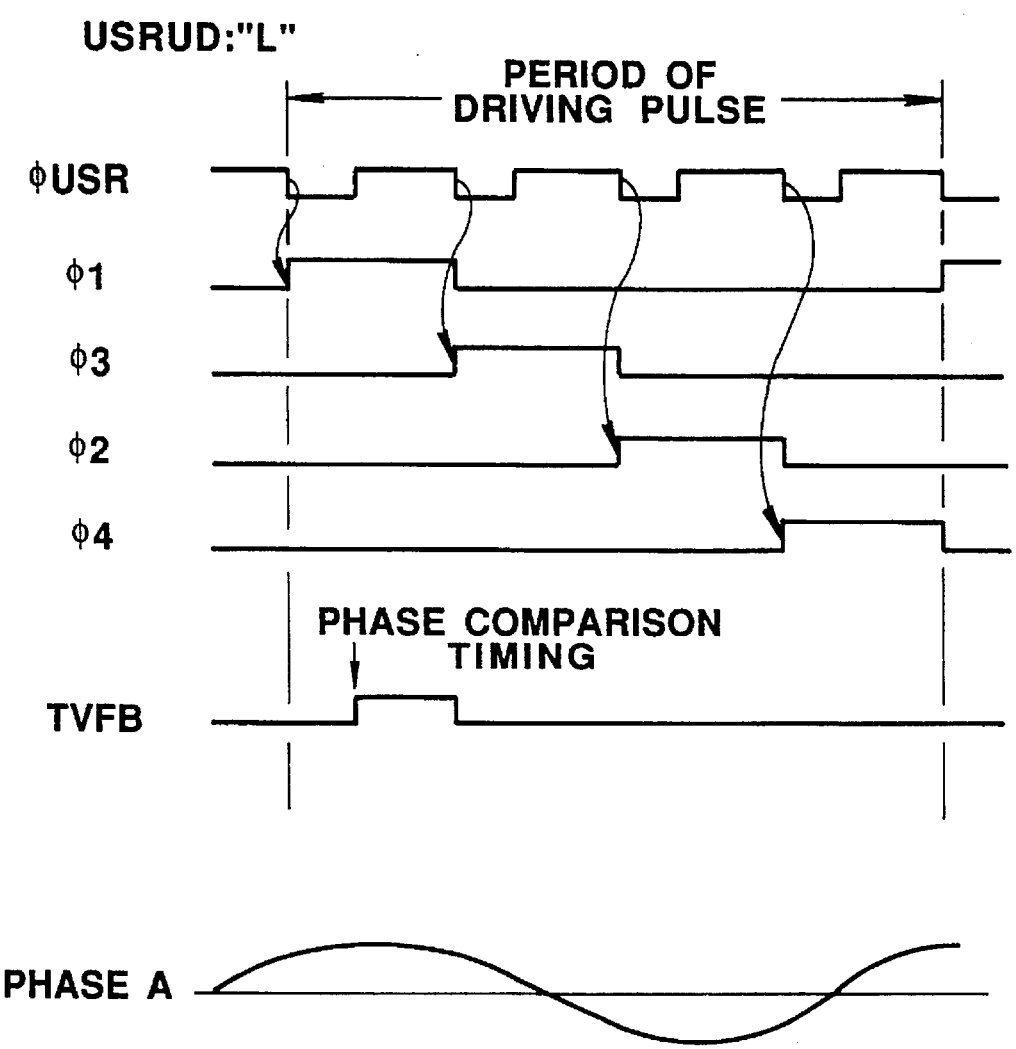
FIG. 27 is a timing chart which illustrates the state of a 4-phase pulse signal of the basic pulse signal in a case where the basic pulse signal is selected with the last transition pulse according to the sixth embodiment.

FIGS. 27 and 28 respectively illustrate a time chart adapted to a case in which USRUD is "L" (FIG. 27) and that adapted to a case in which the same is "H" (FIG. 28).

An assumption is made that one period is 360° and the phase timing is expressed as the phase angle, USDT1, USDT2 and USDT3 are respectively set as shown in Table 1.

TABLE 1

| Phase Angle | 0° to 45° | 45° to 90° | 90° to 135° | 135° to 180° |
|---|---|---|---|---|
| USDT1 | 1 | 1 | 1 | 1 |
| USDT2 | 1 | 1 | 0 | 0 |
| USDT3 | 0 | 1 | 0 | 1 |

| Phase Angle | 180° to 225° | 225° to 270° | 270° to 315° | 315° to 360° |
|---|---|---|---|---|
| USDT1 | 0 | 0 | 0 | 0 |
| USDT2 | 1 | 1 | 0 | 0 |
| USDT3 | 0 | 1 | 0 | 1 |

Thus, the pulse width of φ USR in the period "H" can be maintained at 50% or more and the first transition and the last transition acre switched so as to be used in the lens I/F circuit. Therefore, the phase can be discriminated similarly to the first embodiment. Furthermore, data of USRUD is stored in the memory in the unit so as to be read out similarly to USDT1 and USDT2 at the time of the operation. The waveform of φ USR to be transmitted is determined depending upon a result of regarding that BCPU is in the period of pulse width "L" in a case where USRUD is "H".

According to the sixth embodiment, the unit can be safely and reliably operated even if the output performance of the buffer is insufficient and the φ USR transmission route having a large capacity is used as compared with those according to the fifth embodiment.

Although the lens unit is employed to describe the fifth and the sixth embodiments, the present invention may, of course, be applied to another unit such as a motor drive and a universal head.

As described above, according to the fifth and the sixth embodiments, the timing of discriminating the phase of the monitor signal is determined in accordance with the pulse width of the pulse signal, the frequency of which is four times the AC voltage for driving the supersonic motor to be transmitted from the camera body to the unit having the supersonic motor, and data stored in the memory in the unit. Therefore, a camera system can be provided in which the cost increase due to performing adjustment and unstable control taken place depending upon the temperature can be prevented, the electric power consumption can be reduced and the number of signal contacts can be minimized and which has a monitor electrode processing system which is able to cope with the offset of the phase of the output signal depending upon the location of the monitor electrode of the supersonic motor in the lens unit.

In this invention, it is apparent that working modes which differ over a wide range can be formed on the basis of this invention without departing from the spirit and scope of the invention. This invention is not restricted by any specific embodiment expect as limited by the appended claims.

What is claimed is:

1. A camera system composed of a unit and a camera body from which said unit is detachable, said unit including a supersonic motor having a predetermined operating frequency and arranged to be detachable from said camera body, said camera system comprising:

pulse signal generating means provided in said camera body and generating a pulse signal having a frequency which is four times the operating frequency for driving said supersonic motor and a pulse width which corresponds to a pulse width of an AC voltage for driving said supersonic motor;

AC voltage generating means provided in said unit and generating said AC voltage to be applied to said supersonic motor responsive to said pulse signal derived from said pulse signal generating means;

first information transmitting means provided in said unit and performing information communication to and from said camera body;

driving parameter changing instruction means provided in said unit, for detecting rotation of said supersonic motor and determining information about a change in at least one driving parameter including a frequency and a pulse width of said AC voltage;

second information transmitting means provided in said camera body and performing information communication to and from said unit;

pulse signal control means provided in said camera body and controlling at least one of said frequency and said pulse width of said pulse signal in accordance with said information about a change in said driving parameter determined by said driving parameter changing instruction means; and transmitting means provided in said camera body for transmitting said pulse signal to said unit over a single pulse line.

2. A camera system composed of a unit and a camera body from which said unit is detachable and said unit including a supersonic motor having a predetermined operating frequency and arranged to be detachable from said camera body, said camera system comprising:

pulse signal generating means provided in said camera body and generating a pulse signal having a frequency which is four times the predetermined operating frequency for driving said supersonic motor and a pulse width which corresponds to a pulse width of an AC voltage for driving said supersonic motor;

pulse signal forming means provided in said unit and forming four pulses composed of first to fourth pulse signals from said pulse signal;

said pulse signal being coupled to said pulse signal forming means through a single pair of contacts respectively provided on said camera body and said unit, said pair of contacts being engaged when said unit is mounted on said camera body;

sequence changing means provided in said unit for respectively changing the sequence of said first to fourth pulse signals in accordance with an instruction to rotate said supersonic motor in a forward direction or an instruction to rotate said supersonic motor in a reverse direction;

AC voltage generating means provided in said unit for generating said AC voltage to be applied to said supersonic motor in accordance with said first to fourth pulse signals; and driving parameter changing instruction means provided in said unit, for detecting rotation of said supersonic motor and determining information about a change in at least one driving parameter including a frequency and a pulse width of said AC voltage.

3. A method for controlling operation of a supersonic motor in a unit of a camera system composed of a camera body from which said unit is detachable and said unit including a supersonic motor having an operating frequency and arranged to be detachable from said camera body, said method comprising the steps of:

(a) transmitting parameter information items, which include an initial frequency and a pulse width of operating signals for operating said supersonic motor, from said unit to said camera body by a communication link;

(b) generating a pulse signal in the camera body in accordance with said parameter information and transmitting said pulse signal to said unit over a single line;

(c) driving an AC voltage generating circuit in said unit for generating driving AC voltage responsive to said pulse signal delivered to the unit to commence driving of said supersonic motor;

(d) monitoring rotation of said supersonic motor, to determine information about change in a value of at least one parameter which includes a frequency and a pulse width of the supersonic motor in accordance with the result of monitoring and issuing an instruction of change to said camera body by communication thereto;

(e) changing one of said frequency and said pulse width of said pulse signal in said camera body responsive to said instruction of said change issued from said unit during step (d); and (f) repeating steps (b) to (e) until a predetermined quantity of driving is established and stopping said unit by halting said driving AC voltage generating circuit when said predetermined quantity of driving is established to stop driving of said supersonic motor.

4. A method of controlling operation of a supersonic motor in a unit of a camera system composed of said unit and a camera body from which said unit is detachable and which includes a pulse signal generating means and said unit including a supersonic motor arranged to be detachable from said body and including driving AC voltage generating means, said method comprising the steps of:

(a) generating in said camera body a pulse signal and transmitting said pulse signal to said unit over a single line;

(b) causing said AC voltage generating means to generate driving AC voltage in accordance with the pulse signal received in said unit;

(c) monitoring rotation of said supersonic motor in said unit and transmitting the result of monitoring to said camera body;

(d) changing at least one of a frequency and a pulse width of said pulse signal in accordance with information representing said result of monitoring received in said camera body; and (e) repeating steps (a) to (d).

5. A camera system comprising a camera body and a unit to be detachably coupled to said camera body;

said camera body including:

first interface means for transmitting/receiving data to and from said unit;

pulse generating means for generating a single pulse train having a predetermined frequency and a predetermined duty ratio in accordance with certain data received by said first interface means;

first connection means which includes a single contact terminal connected to said pulse generating means for transmitting said pulse train outside of said camera body; and second connection means connected to said first interface means to receive said data; and said unit including:

third connection means including a single contact terminal being connected to said first connection means when said unit is coupled to said camera body;

fourth connection means being connected to said second connection means when said unit is coupled to said camera body;

AC voltage generating means for generating a plurality of AC voltage signals having different phases in accordance with said pulse train supplied from said third connection means;

a supersonic motor which is operated responsive to said AC voltage supplied from said AC voltage generating means;

monitor means for detecting a state of operation of said supersonic motor including means to transmit the result of the detection; and second interface means for transmitting data about the result of the detection supplied from said monitor means to said camera body via said fourth connection means.

6. A camera system according to claim 5, wherein said pulse generating means changes at least one characteristic of said pulse train including a frequency and a duty cycle of said pulse train in accordance with data about said result of the detection developed by said monitor means and received by said first interface means.

7. A camera system comprising:

a camera body;

an auxiliary unit arranged to be detachable from said camera body;

a supersonic motor provided in said auxiliary unit;

AC voltage generating means provided in said auxiliary unit to generate an AC voltage having an operating frequency for driving said supersonic motor;

instruction means provided in said auxiliary unit to detect a state of operation of said supersonic motor and transmit a command to change one of a group of parameters including a frequency and a pulse width of said AC voltage;

pulse signal generating means provided in said camera body to time-sequentially generate a pulse signal train having a period which is four times the operating frequency of said AC voltage and having a predetermined pulse width;

control means provided in said camera body to change at least one of said frequency and said pulse width of said pulse signal train responsive to the output from said instruction means;

transmitting means provided between said camera body and said auxiliary unit, including a single contact on said camera body and another single contact on said auxiliary unit, said contacts engaging one another when said unit is mounted upon the camera body to transmit said pulse signal train to said AC voltage generating means; and communication means for transmitting said output from said instruction means to said control means.

8. A camera system according to claim 7, wherein said control means includes means for successively increasing or decreasing the total sum of the pulse periods of two adjacent pulses of a group of four continuous pulses of said pulse signal train responsive to the output from said instruction means.

9. A camera system according to claim 7, wherein said AC voltage generating means includes conversion means for converting a series of four pulses of said pulse signal train into four types of independent pulses for forming said AC voltage.

10. A camera system comprising a camera body, an auxiliary unit including a supersonic motor and arranged to be detachably mounted to said camera body and connection means located on a detachment surface between said camera body and said auxiliary unit to transmit/receive signals between said camera body and said auxiliary unit, said auxiliary unit having:

AC means for generating an AC voltage for driving said supersonic motor; and instruction means for detecting a state of operation of said supersonic motor to transmit a command of changing a frequency of said AC voltage, and said camera body having:

pulse means for generating a single pulse signal train having a predetermined frequency and a pulse width for generating said AC voltage;

means for controlling said frequency of said pulse signal in accordance with information supplied from said instruction means; and means for coupling said pulse means to said AC means including a single contact on the camera body coupled to said pulse means and another single contact on the auxiliary unit coupled to AC means, said contacts being engaged when the auxiliary unit is mounted on the camera body.

11. A camera system comprising:

a camera body;

an auxiliary unit arranged to be detachably mounted to said camera body and including a supersonic motor;

pulse signal generating means provided for said camera body to generate a series of pulses in a pulse signal train, said pulses having a predetermined pulse width and a frequency;

AC means provided in said auxiliary unit to generate an AC voltage for driving said supersonic motor in accordance with said pulse signal train, said pulse signal train being coupled to the AC means by a single line;

a member to be driven which is provided in said auxiliary unit and which is driven by said supersonic motor;

means provided in said auxiliary unit to monitor a state of operation of said supersonic motor;

means provided in said auxiliary unit to detect an operational velocity of said member to be driven; and means provided in said camera body for changing frequency of a pulse supplied from said pulse signal generating means to adjust an AC voltage to be applied to said supersonic motor at an optimum frequency responsive to an output from said monitor means, and changing a width of said pulse supplied from said pulse signal generating means to adjust operational velocity of said supersonic motor responsive to an output from said detection means.

12. A camera system having a unit and a camera body to which said unit is detachably mounted, said unit including a supersonic motor having monitor means for detecting rotation, said camera system comprising:

(a) storage means provided in said unit to store at least two types of data relating to a phase comparison timing of an output signal from said monitor means;

(b) pulse signal generating means provided in said camera body to generate a pulse having a frequency which is about four times a frequency for driving said supersonic motor and a pulse width which corresponds to data relating to a phase comparison timing of an output signal from said monitor means;

(c) pulse forming means provided in said unit to form four pulses from said pulse signal as first to fourth pulse signals;

(d) AC voltage generating means provided in said unit to generate an AC voltage to be applied to said supersonic motor responsive to said first to fourth pulse signals;

(e) phase discriminating means provided in said unit to discriminate a phase of an output signal from monitor means in accordance with data stored in said storage means relating to said phase comparison timing and said pulse signal; and (f) driving parameter changing instruction means provided in said unit to determine information about a change in frequency of said pulse signal responsive to an output from said phase discriminating means.

13. A camera system comprising:

a camera body;

an auxiliary unit arranged to be detachably mounted to said camera body and including a supersonic motor;

pulse signal generating means provided in said camera body to generate a series of pulses in a pulse signal train having a predetermined pulse width and frequency;

means provided in said auxiliary unit to generate an AC voltage for driving said supersonic motor in accordance with said pulse signal train;

storage means provided in said auxiliary unit to store predetermined timing data;

means provided in said auxiliary unit to discriminate a state of a phase of an output from a means which monitors operation of said supersonic motor;

timing setting means provided in said camera body to set discrimination timing of said discriminating means as a pulse width of said pulse signal in accordance with the output from the storage means in said auxiliary unit; and means provided in said camera body to change frequency of a pulse supplied from said pulse signal generating means to set said AC voltage at an optimum frequency responsive to an output from said discriminating means.

14. A camera system having, as a driving source, a supersonic motor which is driven by an AC voltage and which has a monitor electrode for detecting an operating state of the motor, said camera system comprising:

means for discriminating a phase of an output from said monitor electrode;

means for generating a basic pulse signal having a frequency of which is about four times that of a required AC voltage;

means for setting discriminating timing of said phase discriminating means in accordance with a pulse width of said basic pulse signal;

means for generating said AC voltage in accordance with a 4-phase driving pulse generated in accordance with said basic pulse signal; and said discriminating timing setting means including means for setting said timing in accordance with the output from a storage means which stores first data about the sequential number of the pulse at which said discrimination is made assuming that continuous four basic pulses from one set and second data about the moment during the generation of said pulses at which said discrimination is made.

15. A camera system comprising a camera body and a unit to be detachably coupled to said camera body, said camera body including:

first interface means for transmitting/receiving data to and from said unit;

pulse generating means for generating a pulse train having a predetermined frequency and a predetermined duty ratio responsive to said data received by said first interface means;

first connection means connected to said pulse generating means to transmit said pulse train outside of said camera body over a single line;

second connection means connected to said first interface means to receive said data; and said unit including:

third connection means which is connected to said first connection means when said unit is coupled to said camera body;

fourth connection means which is connected to said second connection means when said unit is coupled to said camera body;

AC voltage generating means for generating a plurality of AC voltages having different phases in accordance with said pulse train supplied from said third connection means;

a supersonic motor which is operated responsive to said AC voltage supplied from said AC voltage generating means;

storage means for storing the operating characteristics of said supersonic motor; and second interface means for transmitting data stored in said storage means to said camera body via said fourth connection means, wherein said pulse generating means determines a duty ratio of said pulse train responsive to data supplied from said first interface means and stored in said storage means.

16. A camera system according to claims 15, wherein said unit further includes:

monitor means for determining a state of the operation of said supersonic motor to transmit the result of the detection to said camera body via said second interface means, and said pulse generating means including means for changing the frequency of said pulse train responsive to a result of a detection made by said monitor means supplied from said first interface means.

17. A camera system according to claim 16, wherein said monitor means monitors a state of the operation of said supersonic motor at a predetermined timing determined in accordance with said pulse train supplied from said second connection means.

18. A camera system comprising a camera body and a unit to be detachably coupled to said camera body, said camera body including:

pulse generating means for generating a single pulse train having a predetermined frequency and a predetermined duty ratio;

first connection means connected to said pulse generating means to transmit said pulse train outside of said camera body over a single line; and said unit including:

second connection means connected to said first connection means when said unit is coupled to said camera body;

AC voltage generating means for generating a plurality of AC voltages having different phases responsive to said pulse train supplied from said second connection means; and a supersonic motor which is operated responsive to said AC voltages supplied from said AC voltage generating means.

19. A camera system according to claim 18, wherein said unit further includes:

monitor means for detecting a state of the operation of said supersonic motor; and third connection means for transmitting an output from said monitor means to said camera body; and said camera body further including:

fourth connection means connected to said third connection means when said unit is coupled to said camera body; wherein said pulse generating means changes at least one of said frequency and said duty ratio of said pulse train in accordance with the output from said monitor means supplied from said fourth connection means.

20. A camera system according to claim 18, wherein said unit further includes:

storage means for storing operating characteristics of said supersonic motor; and third connection means for transmitting a value stored in said storage means to said camera body; and said camera body further including:

fourth connection means connected to said third connection means when said unit is coupled said camera body, wherein said pulse generating means determines said duty ratio of said pulse train in accordance with the output from said storage means supplied from said fourth connection means.

21. A camera system comprising a camera body and a unit detachably mounted to said camera body and including a supersonic motor, wherein said camera body includes pulse generating means for generating a signal pulse train for controlling a frequency for driving said supersonic motor and a driving velocity of said supersonic motor; and said unit further includes AC voltage generating means for generating a plurality of AC voltages having different phases for driving said supersonic motor in accordance with said signal pulse train supplied from said camera body through a single line between said camera body and said detachable unit.

22. A camera system according to claim 21, wherein said unit further includes monitor means for detecting the state of the operation of said supersonic motor, and said pulse generating means of said camera body includes means for changing at least one of said frequency and said duty ratio of said pulse train in accordance with an output from said monitor means.

23. A camera system according to claim 21, wherein said unit further includes:

storage means for storing the characteristics of said supersonic motor; and said pulse generating means of said camera body determines said duty ratio of said pulse train in accordance with the output from said storage means.

* * * * *